United States Patent
Zhang

(10) Patent No.: US 10,924,236 B2
(45) Date of Patent: Feb. 16, 2021

(54) RESOURCE MAPPING METHOD, TRANSMIT END, AND RECEIVE END

(71) Applicant: HUAWEI TECHNOLOGIES CO., LTD., Guangdong (CN)

(72) Inventor: Yongping Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/362,087

(22) Filed: Mar. 22, 2019

(65) Prior Publication Data

US 2019/0222381 A1 Jul. 18, 2019

Related U.S. Application Data

(63) Continuation of application No. PCT/CN2016/099858, filed on Sep. 23, 2016.

(51) Int. Cl.
| | | |
|---|---|---|
| *H04L 5/00* | (2006.01) | |
| *H04W 72/12* | (2009.01) | |
| *H04L 27/26* | (2006.01) | |

(52) U.S. Cl.
CPC ............ *H04L 5/0048* (2013.01); *H04L 5/001* (2013.01); *H04L 27/26* (2013.01); *H04W 72/1205* (2013.01)

(58) Field of Classification Search
CPC ... H04L 5/0048; H04L 5/001; H04W 72/1205
See application file for complete search history.

(56) References Cited

U.S. PATENT DOCUMENTS

| | | | | |
|---|---|---|---|---|
| 2009/0303946 A1* | 12/2009 | Yokoyama | ............ | H04L 5/0048 370/329 |
| 2011/0310838 A1* | 12/2011 | Zheng | .................. | H04L 5/0053 370/330 |

(Continued)

FOREIGN PATENT DOCUMENTS

| | | |
|---|---|---|
| CN | 101483916 A | 7/2009 |
| CN | 102769593 A | 11/2012 |

(Continued)

OTHER PUBLICATIONS

PCT International Search Report and Written Opinion issued in International Application No. PCT/CN2016/099858 dated May 31, 2017, 21 pages (with English translation).

(Continued)

*Primary Examiner* — Jamal Javaid
(74) *Attorney, Agent, or Firm* — Fish & Richardson P.C.

(57) ABSTRACT

Embodiments of the present invention disclose a resource mapping method. The method includes: obtaining, by a transmit end, at least one of subcarrier spacing configuration parameter information, current operating frequency information, a currently supported moving speed, and scheduled bandwidth information; determining, by the transmit end based on the at least one of the subcarrier spacing configuration parameter information, the current operating frequency information, the currently supported moving speed, and the scheduled bandwidth information, a time-frequency resource location for mapping a reference signal; and mapping, by the transmit end, the reference signal at the time-frequency resource location.

20 Claims, 8 Drawing Sheets

(56) References Cited

U.S. PATENT DOCUMENTS

| | | | | |
|---|---|---|---|---|
| 2012/0207199 A1* | 8/2012 | Guo | ................. | H04L 1/0026 |
| | | | | 375/224 |
| 2014/0293881 A1 | 10/2014 | Khoshnevis et al. | | |
| 2016/0094377 A1 | 3/2016 | Chen et al. | | |
| 2017/0208513 A1* | 7/2017 | Hwang | ............. | H04W 36/0083 |

FOREIGN PATENT DOCUMENTS

| | | |
|---|---|---|
| CN | 103428143 A | 12/2013 |
| CN | 104253680 A | 12/2014 |
| EP | 3487241 A1 | 5/2019 |
| JP | 2016518758 A | 6/2016 |
| WO | 2005015797 A1 | 2/2005 |
| WO | 2016004634 A1 | 1/2016 |

OTHER PUBLICATIONS

Extended European Search Report issued in European Application No. 16916540.4 dated Aug. 21, 2019, 8 pages.
Office Action issued in Chinese Application No. 201680088063.4 dated Mar. 4, 2020, 15 pages (With English Translation).
Office Action issued in Japanese Application No. 2019-515815 dated Jun. 30, 2020, 6 pages (with English translation).
Office Action issued in Korean Application No. 2019-7010928 dated Dec. 18, 2020, 8 pages (with English translation).

* cited by examiner

Transmit end          Receive end

RESOURCE MAPPING METHOD, TRANSMIT END, AND RECEIVE END

CROSS-REFERENCE TO RELATED APPLICATIONS

This application is a continuation of International Application No. PCT/CN2016/099858, filed on Sep. 23, 2016, the disclosure of which is hereby incorporated by reference in its entirety.

TECHNICAL FIELD

The present invention relates to the communications field, and in particular to a resource mapping method, a transmit end, and a receive end.

BACKGROUND

Fullband (including an existing frequency band below 6 GHz, and a frequency band of 6 GHz to a 100 GHz) access will be implemented in a future 5G system. For a frequency band above 6 GHz, especially a millimeter-wave band, non-ideality of hardware leads to phase noise, and the phase noise causes inter-subcarrier interference (ICI) in an orthogonal frequency-division multiplexing (OFDM) system, causing significant deterioration in system communication quality. A most practical approach to eliminate ICI is to increase a subcarrier spacing. In the future 5G system, different subcarrier spacing configurations are used. In this way, when the system operates at a high frequency band, an OFDM configuration parameter corresponding to a relatively large subcarrier spacing is used; when the system operates at a low frequency band, an OFDM configuration parameter corresponding to a relatively small subcarrier spacing is used.

In a communications system, to ensure that a receiver can correctly demodulate a signal, some reference signals and data need to be sent alternately, so that the receiver can correctly estimate channel information, and offset, by using the estimated channel information, impact on data received on a channel, improving a receiving effect of the receiver. An insertion spacing of reference signals needs to match a coherence bandwidth of a channel in frequency domain, and needs to match a coherence time of a channel in time domain.

The future 5G system operates at different frequencies, and uses different subcarrier spacing configurations. If a fixed mapping method is still used in high and low frequency systems, density of reference signals is excessively low or high. There is a high possibility that an equivalent channel parameter obtained through channel estimation based on the received reference signal is not accurate enough.

SUMMARY

Embodiments of the present invention provide a resource mapping method, a transmit end, and a receive end. The transmit end determines density of reference signals in frequency domain and time domain based on information such as a subcarrier spacing configuration parameter, so that the density of the reference signals can still match a coherence bandwidth and a coherence time of a corresponding channel, and reference signal mapping or receiving can be performed when a system operates at different frequencies and uses different subcarrier spacings, thereby satisfying a receiving and sending requirement for the communications system.

A future 5G system operates at different frequencies, and may use different subcarrier spacing configurations. If a fixed mapping method is used in high and low frequency systems, density of reference signals is excessively low or high. The embodiments of the present invention are used to resolve this problem. The present invention is mainly applicable to a communications system, including a transmit end and a receive end. Network elements related to the transmit end may include a base station, a wireless access point, or user equipment UE. Network elements related to the receive end may include user equipment, a terminal, a mobile station (MS), a base station, or the like.

A first aspect of the embodiments of the present invention provides a resource mapping method. The method may include: determining, by a transmit end, a scheduled time-frequency resource, where information that is related to the scheduled time-frequency resource and that is obtained by the transmit end may include but is not limited to information such as subcarrier spacing configuration parameter information, current operating frequency information of a system, a moving speed currently supported by the system, and scheduled bandwidth information; determining, by the transmit end based on at least one of the subcarrier spacing configuration parameter information, the current operating frequency information, the currently supported moving speed, and the scheduled bandwidth information, a time-domain/frequency-domain resource location for mapping a reference signal; mapping, by the transmit end, the reference signal at the time-domain/frequency-domain resource location; and sending, by the transmit end, the reference signal to a receive end.

In this embodiment of the present invention, herein the transmit end determines the time-domain/frequency-domain resource location for mapping the reference signal; maps the reference signal at the time-domain/frequency-domain resource location; and determines density of to-be-sent reference signals. The density of the reference signals in frequency domain and time domain may be determined based on the information including the subcarrier spacing configuration parameter. The density of the reference signals in frequency domain and time domain is variable, so that the density of the reference signals can still match a coherence bandwidth and a coherence time of a corresponding channel when a system operates at different frequencies and uses different subcarrier spacings, thereby satisfying a receiving and sending requirement for the communications system.

With reference to the first aspect of the embodiments of the present invention, in a first implementation of the first aspect of the embodiments of the present invention, the determining, by the transmit end based on at least one of the subcarrier spacing configuration parameter information, the current operating frequency information, the currently supported moving speed, and the scheduled bandwidth information, a time-domain/frequency-domain resource location for mapping a reference signal may include: determining, by the transmit end, an interval of reference signals based on the at least one of the subcarrier spacing configuration parameter information, the current operating frequency information, the currently supported moving speed, and the scheduled bandwidth information; and determining, by the transmit end based on the interval of the reference signals, the time-domain/frequency-domain resource location for mapping the reference signal.

In this embodiment of the present invention, the transmit end may determine the interval of the reference signals based on the information such as the subcarrier spacing configuration parameter information, the current operating frequency information, the currently supported moving speed, and the scheduled bandwidth information. Herein the interval of the reference signals represents the density of the reference signals. The interval of the reference signals may include an interval in a time dimension and an interval in a frequency dimension. Then, the time-domain/frequency-domain resource location for mapping the reference signal is determined based on the determined interval of the reference signals.

With reference to the first aspect of the embodiments of the present invention, in a second implementation of the first aspect of the embodiments of the present invention, the determining, by the transmit end based on at least one of the subcarrier spacing configuration parameter information, the current operating frequency information, the currently supported moving speed, and the scheduled bandwidth information, a time-domain/frequency-domain resource location for mapping a reference signal may include: determining, by the transmit end according to a preset rule and based on the at least one of the subcarrier spacing configuration parameter information, the current operating frequency information, the currently supported moving speed, and the scheduled bandwidth information, the time-domain/frequency-domain resource location for mapping the reference signal. It should be understood that the preset rule herein is known by both the transmit end and the receive end in advance.

In this embodiment of the present invention, determining, by the transmit end according to the preset rule, the time-domain/frequency-domain resource location for sending the reference signal is static configuration. The transmit end configures, according to the preset rule, the time-domain/frequency-domain resource location for mapping the reference signal, and the receive end also configures, according to the preset rule, the time-domain/frequency-domain resource location for receiving the reference signal. This preset rule is a rule known by both the transmit end and the receive end in advance. Therefore, this provides an optional implementation of the embodiments of the present invention.

With reference to any one of the first aspect of the embodiments of the present invention, or the first and the second implementations of the first aspect of the embodiments of the present invention, in a third implementation of the first aspect of the embodiments of the present invention, the time-domain/frequency-domain resource location for mapping the reference signal is represented by (k, l), where k is a subcarrier number of the reference signal, and l is an orthogonal frequency-division multiplexing (OFDM) symbol number of the reference signal; and the determining, by the transmit end based on at least one of the subcarrier spacing configuration parameter information, the current operating frequency information, the currently supported moving speed, and the scheduled bandwidth information, a time-domain/frequency-domain resource location for mapping a reference signal may include the following several cases:

(1) determining, by the transmit end based on the at least one of the subcarrier spacing configuration parameter information, the current operating frequency information, the currently supported moving speed, and the scheduled bandwidth information, the subcarrier number k of the to-be-mapped reference signal, where the OFDM symbol number l is a first preset value; or (2) determining, by the transmit end based on the at least one of the subcarrier spacing configuration parameter information, the current operating frequency information, the currently supported moving speed, and the scheduled bandwidth information, the OFDM symbol number l of the to-be-mapped reference signal, where the subcarrier number k is a second preset value; or (3) determining, by the transmit end based on the at least one of the subcarrier spacing configuration parameter information, the current operating frequency information, the currently supported moving speed, and the scheduled bandwidth information, the subcarrier number k and the OFDM symbol number l of the to-be-mapped reference signal.

In this embodiment of the present invention, if the time-domain/frequency-domain resource location is represented by (k, l), where k is the subcarrier number of the reference signal, and l is the orthogonal frequency-division multiplexing (OFDM) symbol number of the reference signal, the transmit end may determine the subcarrier number k and the OFDM symbol number l of the to-be-mapped reference signal based on the at least one of the subcarrier spacing configuration parameter information, the current operating frequency information, the currently supported moving speed, and the scheduled bandwidth information; or determine the subcarrier number k of the to-be-mapped reference signal, where the OFDM symbol number l is a fixed value; or determine the OFDM symbol number l of the to-be-mapped reference signal, where the subcarrier number k is a fixed value. This further specifically provides an implementation of determining the time-domain/frequency-domain resource location for mapping the reference signal.

With reference to any one of the first aspect of the embodiments of the present invention, or the first and the second implementations of the first aspect of the embodiments of the present invention, in a fourth implementation of the first aspect of the embodiments of the present invention, the method may further include: if the transmit end includes a base station, sending, by the transmit end, reference signal location configuration information to the receive end; or if the transmit end includes user equipment, receiving, by the transmit end, reference signal location configuration information and determining, based on the reference signal location configuration information, the time-domain/frequency-domain resource location for mapping the reference signal.

A second aspect of the embodiments of the present invention provides a resource mapping method. The method may include: determining, by a receive end, a scheduled time-frequency resource, where information that is related to the scheduled time-frequency resource and that is obtained by the receive end includes but is not limited to information such as subcarrier spacing configuration parameter information, current operating frequency information, a currently supported moving speed, and scheduled bandwidth information; determining, by the receive end based on at least one of the subcarrier spacing configuration parameter information, the current operating frequency information, the currently supported moving speed, and the scheduled bandwidth information, a time-domain/frequency-domain resource location for receiving a reference signal; and receiving, by the receive end at the time-domain/frequency-domain resource location, the reference signal sent by a transmit end.

In this embodiment of the present invention, herein determining, by the receive end, the time-domain/frequency-domain resource location for receiving the reference signal means determining density of to-be-received reference signals. The density of the reference signals in frequency domain and time domain may be determined based on the information including the subcarrier spacing configuration parameter. The density of the reference signals in frequency domain and time domain is variable, so that the density of the reference signals can still match a coherence bandwidth and a coherence time of a corresponding channel when a system operates at different frequencies and uses different subcarrier spacings, thereby satisfying a receiving and sending requirement for the communications system.

With reference to the second aspect of the embodiments of the present invention, in a first implementation of the second aspect of the embodiments of the present invention, the determining, by the receive end based on at least one of the subcarrier spacing configuration parameter information, the current operating frequency information, the currently supported moving speed, and the scheduled bandwidth information, a time-domain/frequency-domain resource location for receiving a reference signal may include: determining, by the receive end, an interval of reference signals based on the at least one of the subcarrier spacing configuration parameter information, the current operating frequency information, the currently supported moving speed, and the scheduled bandwidth information; and determining, by the receive end based on the interval of the reference signals, the time-domain/frequency-domain resource location for receiving the reference signal.

In this embodiment of the present invention, the receive end may determine the interval of the reference signals based on the information such as the subcarrier spacing configuration parameter information, the current operating frequency information, the currently supported moving speed, and the scheduled bandwidth information. Herein the interval of the reference signals represents the density of the reference signals. The interval of the reference signals may include an interval in a time dimension and an interval in a frequency dimension. Then, the time-domain/frequency-domain resource location for receiving the reference signal is determined based on the determined interval of the reference signals.

With reference to the second aspect of the embodiments of the present invention, in a second implementation of the second aspect of the embodiments of the present invention, the determining, by the receive end based on at least one of the subcarrier spacing configuration parameter information, the current operating frequency information, the currently supported moving speed, and the scheduled bandwidth information, a time-domain/frequency-domain resource location for receiving a reference signal includes: determining, by the receive end according to a preset rule and based on the at least one of the subcarrier spacing configuration parameter information, the current operating frequency information, the currently supported moving speed, and the scheduled bandwidth information, the time-domain/frequency-domain resource location for receiving the reference signal. It should be understood that the preset rule herein is known by both the transmit end and the receive end in advance.

In this embodiment of the present invention, determining, by the receive end according to the preset rule, the time-domain/frequency-domain resource location for receiving the reference signal is static configuration. The receive end configures, according to the preset rule, the time-domain/frequency-domain resource location for receiving the reference signal, and the transmit end also configures, according to the preset rule, the time-domain/frequency-domain resource location for sending the reference signal. This preset rule is a rule known by both the transmit end and the receive end in advance. Therefore, this provides an optional implementation of the embodiments of the present invention.

With reference to any one of the second aspect of the embodiments of the present invention, or the first and the second implementations of the second aspect of the embodiments of the present invention, in a third implementation of the second aspect of the embodiments of the present invention, the time-domain/frequency-domain resource location for receiving the reference signal is represented by (k, l), where k is a subcarrier number of the reference signal, and l is an OFDM symbol number of the reference signal; and the determining, by the receive end based on at least one of the subcarrier spacing configuration parameter information, the current operating frequency information, the currently supported moving speed, and the scheduled bandwidth information, a time-domain/frequency-domain resource location for receiving a reference signal may include the following several cases:

(1) determining, by the receive end based on the at least one of the subcarrier spacing configuration parameter information, the current operating frequency information, the currently supported moving speed, and the scheduled bandwidth information, the subcarrier number k of the to-be-received reference signal, where the OFDM symbol number l is a first preset value; or (2) determining, by the receive end based on the at least one of the subcarrier spacing configuration parameter information, the current operating frequency information, the currently supported moving speed, and the scheduled bandwidth information, the OFDM symbol number l of the to-be-received reference signal, where the subcarrier number k is a second preset value; or (3) determining, by the receive end based on the at least one of the subcarrier spacing configuration parameter information, the current operating frequency information, the currently supported moving speed, and the scheduled bandwidth information, the subcarrier number k and the OFDM symbol number l of the to-be-received reference signal.

In this embodiment of the present invention, if the time-domain/frequency-domain resource location is represented by (k, l), where k is the subcarrier number of the reference signal, and l is the orthogonal frequency-division multiplexing (OFDM) symbol number of the reference signal, the receive end may determine the subcarrier number k and the OFDM symbol number l of the to-be-received reference signal based on the at least one of the subcarrier spacing configuration parameter information, the current operating frequency information, the currently supported moving speed, and the scheduled bandwidth information; or determine the subcarrier number k of the to-be-received reference signal, where the OFDM symbol number l is a fixed value; or determine the OFDM symbol number l of the to-be-received reference signal, where the subcarrier number k is a fixed value. This further specifically provides an implementation of determining the time-domain/frequency-domain resource location for receiving the reference signal.

With reference to any one of the second aspect of the embodiments of the present invention, or the first and the second implementations of the second aspect of the embodiments of the present invention, in a fourth implementation of the second aspect of the embodiments of the present invention, the method may further include: if the receive end includes a base station, sending, by the receive end, reference signal location configuration information to the transmit end, where the reference signal location configuration information is used by the transmit end to determine the time-domain/frequency-domain resource location for mapping the reference signal; of if the receive end includes user equipment, receiving, by the receive end, reference signal location configuration information sent by the transmit end and determining, based on the reference signal location configuration information, the time-domain/frequency-domain resource location for receiving the reference signal.

A third aspect of the embodiments of the present invention provides a transmit end that has corresponding functions of determining the time-frequency resource location for mapping the reference signal, and mapping the reference signal that are provided in the first aspect. The functions may be implemented by using hardware or may be implemented by hardware by executing corresponding software. The hardware or software includes one or more modules corresponding to the functions.

A fourth aspect of the embodiments of the present invention provides a receive end that has corresponding functions of determining the time-frequency resource location for receiving the reference signal, and receiving the reference signal that are provided in the second aspect. The functions may be implemented by using hardware or may be implemented by hardware by executing corresponding software. The hardware or software includes one or more modules corresponding to the functions.

A fifth aspect of the embodiments of the present invention provides a transmit end that may include a transceiver, a processor, a memory, and a bus, where the transceiver, the processor, and the memory are connected by using the bus;

the memory is configured to store an operation instruction;

the processor is configured to: obtain at least one of subcarrier spacing configuration parameter information, current operating frequency information, a currently supported moving speed, and scheduled bandwidth information; and determine, based on the at least one of the subcarrier spacing configuration parameter information, the current operating frequency information, the currently supported moving speed, and the scheduled bandwidth information, a time-frequency resource location for mapping a reference signal; and the transceiver is configured to map the reference signal at the time-frequency resource location.

A sixth aspect of the embodiments of the present invention provides a receive end that may include a transceiver, a processor, a memory, and a bus, where the transceiver, the processor, and the memory are connected by using the bus;

the memory is configured to store an operation instruction;

the processor is configured to: obtain at least one of subcarrier spacing configuration parameter information, current operating frequency information, a currently supported moving speed, and scheduled bandwidth information; and determine, based on the at least one of the subcarrier spacing configuration parameter information, the current operating frequency information, the currently supported moving speed, and the scheduled bandwidth information, a time-frequency resource location for receiving a reference signal; and the transceiver is configured to receive, at the time-frequency resource location, the reference signal sent by a transmit end.

A seventh aspect of the embodiments of the present invention provides a storage medium. It should be noted that the technical solutions of the present invention essentially, or the part contributing to the prior art, or all or some of the technical solutions may be implemented in a form of a software product. The computer software product is stored in a storage medium. The storage medium is configured to store a computer software instruction for use by the foregoing device. The computer software product includes a program designed for the receive end or the transmit end in the first aspect, the second aspect, the third aspect, or the fourth aspect.

The storage medium includes any medium that can store program code, such as a USB flash drive, a removable hard disk, a read-only memory (ROM), a random access memory (RAM), a magnetic disk, or an optical disc.

In the technical solutions provided in the embodiments of the present invention, the embodiments of the present invention have the following advantages:

In the embodiments of the present invention, the transmit end obtains the at least one of the subcarrier spacing configuration parameter information, the current operating frequency information, the currently supported moving speed, and the scheduled bandwidth information; the transmit end determines, based on the at least one of the subcarrier spacing configuration parameter information, the current operating frequency information, the currently supported moving speed, and the scheduled bandwidth information, the time-frequency resource location for mapping the reference signal; and the transmit end maps the reference signal at the time-frequency resource location. The transmit end determines the density of the reference signals in frequency domain and time domain based on the subcarrier spacing configuration parameter information, so that the density of the reference signals can still match the coherence bandwidth and the coherence time of the corresponding channel, and reference signal mapping can be performed when the system operates at different frequencies and uses different subcarrier spacings, thereby satisfying the receiving and sending requirement for the communications system.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in appropriate cases so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units expressly listed, but may include other steps or units not expressly listed or inherent to such a process, method, product, or device.

Figure 1:
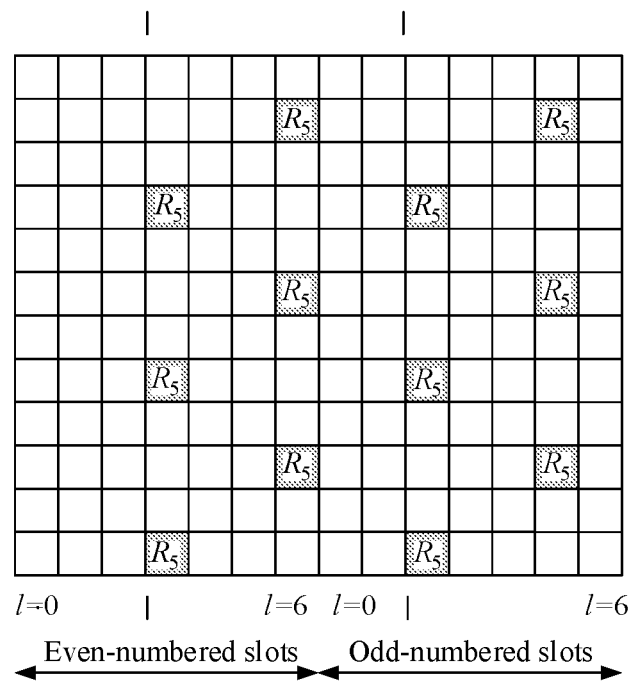
FIG. 1 is a schematic diagram of an embodiment of reference signal insertion according to an embodiment of the present invention.

In the prior art, using an existing Long Term Evolution (LTE) system as an example, LTE operates at a low frequency band (which is not greater than 3 GHz, and frequency spectra of operators may be different), a subcarrier spacing is 15 kHz, each subframe includes 14 OFDM symbols, and duration of one subframe is 1 ms. Reference signal insertion is shown in FIG. 1. Reference signals R5 are placed at an equal interval of four OFDM symbols in one subframe. To be specific, for a data portion (in LTE, first three OFDM symbols in each subframe are used to transmit a control channel, and receiving of the control channel is based on a common pilot cell-specific reference signal (CRS), a reference signal is inserted at an interval of two OFDM symbols in terms of time, and a reference signal is inserted at an interval of three subcarriers in terms of frequency.

orthogonal frequency-division multiplexing (OFDM) can be used to divide a wideband channel into flat fading sub-channels, to effectively adapt to frequency selective fading that occurs in the wideband channel, so that the system achieves quite high spectral efficiency. At present, OFDM is the most common multiplexing manner in communications systems, and a future 5G system will also use OFDM or an OFDM-based improved solution as a multiplexing manner. The future 5G system operates at different frequencies, and may use different subcarrier spacing configurations. If a fixed mapping method is used in high and low frequency systems, density of reference signals is excessively low or high. For example, the method in FIG. 1 is used for both a high frequency and a low frequency. In a low frequency system, there is no great problem; but in a high frequency system, an interval of reference signals becomes large because a relatively large subcarrier spacing is used. In the high frequency system, a subcarrier spacing of 120 kHz is used as an example. In this case, an interval of the reference signals is eight times as large as an interval in the LTE system in frequency domain. A high frequency channel still has frequency selectivity to some extent, and consequently distribution of the reference signals is excessively sparse in frequency domain. An interval of the reference signals is only ⅛ of that in the LTE system in terms of time. It is generally considered that the high frequency system is mainly applied to a low-speed scenario and a speed supported by the high frequency system is far lower than that supported by the low frequency system, resulting in an excessively small interval of the reference signals in terms of time.

Figure 2:
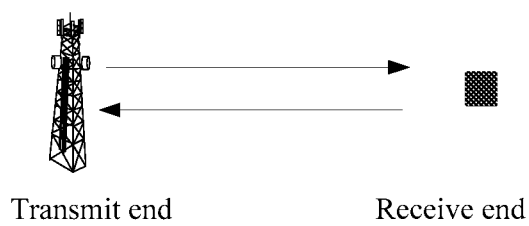
FIG. 2 is a schematic diagram of an embodiment of a scenario to which an embodiment of the present invention is applied.

A diagram of a scenario to which an embodiment of the present invention is applied is shown in FIG. 2. The present invention is mainly applicable to a communications system, including a transmit end and a receive end. It should be understood that FIG. 2 is only a schematic diagram of a scenario to which the present invention is applied. Transmission between the transmit end and the receive end may be performed by using a radio wave, or may be performed by using a transmission medium such as visible light, a laser, infrared light, or an optical fiber. Network elements related to the transmit end may include a base station, a wireless access point, or user equipment UE. Network elements related to the receive end may include user equipment, a terminal, a mobile station (MS), a base station, or the like. In an embodiment, the transmit end is a base station, and the receive end is user equipment; or the transmit end is user equipment, and the receive end is a base station.

In the technical solutions of the present invention, the base station determines intervals of reference signals in frequency domain and time domain based on determined information such as an OFDM subcarrier spacing configuration parameter, and/or a current operating frequency, and/or a currently supported moving speed; and maps, based on the intervals, the reference signal on a time-frequency resource scheduled for the current UE. The UE determines the intervals of the reference signals in frequency domain and time domain based on the information such as the OFDM subcarrier spacing configuration parameter, and/or the current operating frequency, and/or the currently supported moving speed; and receives, based on the intervals, the reference signal on a corresponding time-frequency resource within a time-frequency resource range specified by the base station. Compared with the prior art, the reference signal resource mapping method provided in the present invention allows the density of the reference signals to still match a coherence bandwidth and a coherence time of a channel at a corresponding operating frequency when different system operating frequencies cause different duration of OFDM symbols.

Figure 3:
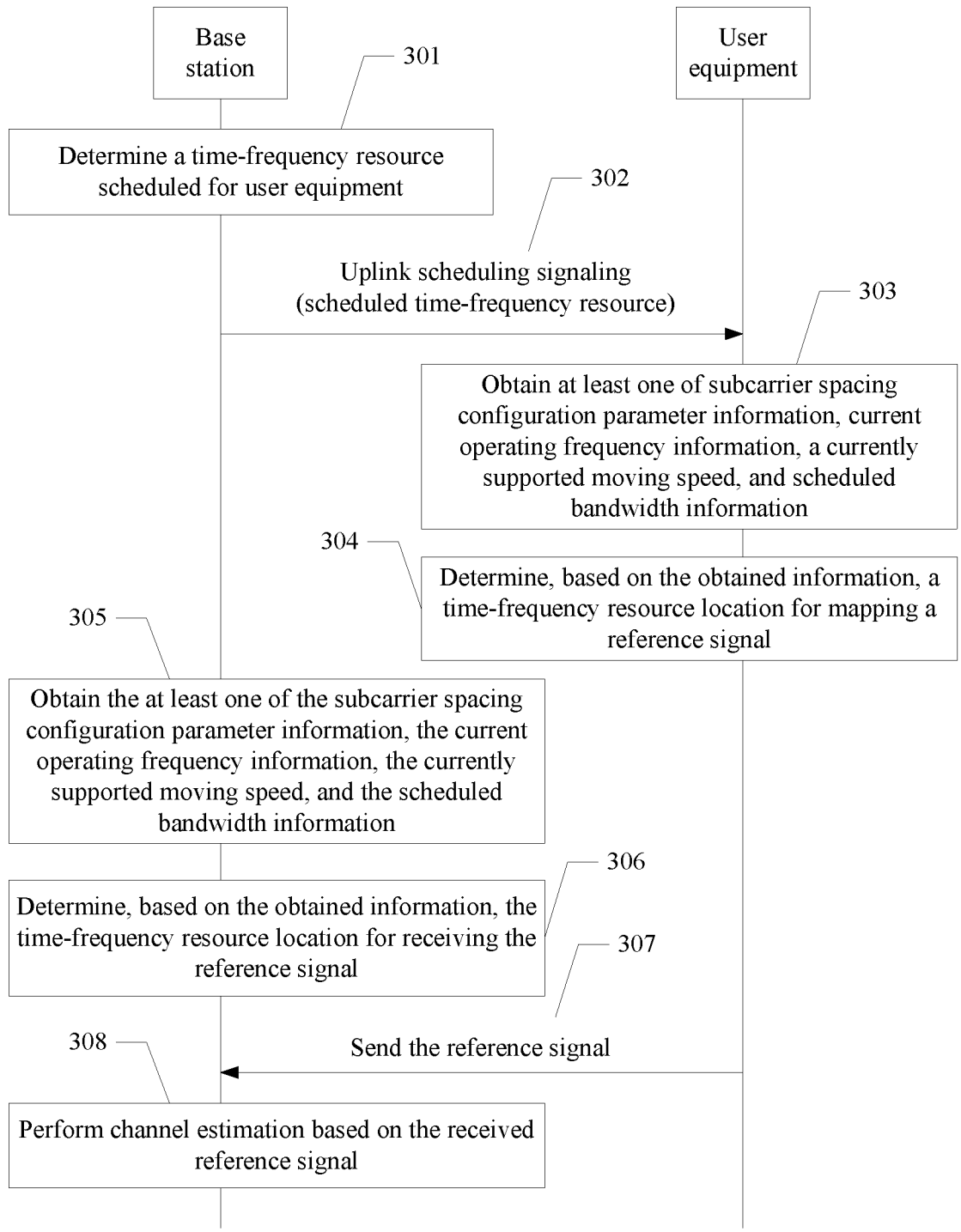
FIG. 3 is a schematic diagram of an embodiment of a resource mapping method according to an embodiment of the present invention.

The following further describes the technical solutions of the present invention by using embodiments. As shown in FIG. 3, FIG. 3 is a schematic diagram of an embodiment of a resource mapping method according to an embodiment of the present invention. An uplink receiving and sending process in LTE communication, that is, a transmit end is UE and a receive end is a base station, is used as an example for description herein. The method includes the following steps.

301. The base station determines a time-frequency resource scheduled for the user equipment.

302. The base station sends uplink scheduling signaling to the user equipment, where the uplink scheduling signaling includes the scheduled time-frequency resource.

This step may include step a and step b as follows:

a. The base station sends the uplink scheduling signaling to the user equipment, where the uplink scheduling signaling includes the scheduled time-frequency resource.

b. The user equipment receives the uplink scheduling signaling sent by the base station, where the uplink scheduling signaling includes the scheduled time-frequency resource.

In this embodiment of the present invention, the base station determines the time-frequency resource scheduled for the user equipment; the base station sends the uplink scheduling signaling to the user equipment, where the uplink scheduling signaling includes the scheduled time-frequency resource; and the user equipment receives the uplink scheduling signaling sent by the base station, where the uplink scheduling signaling includes the scheduled time-frequency resource.

303. The user equipment obtains at least one of subcarrier spacing configuration parameter information, current operating frequency information, a currently supported moving speed, and scheduled bandwidth information.

In this embodiments of the present invention, the user equipment receives the uplink scheduling signaling sent by the base station, and the user equipment obtains the scheduled time-frequency resource, and the at least one of the subcarrier spacing configuration parameter information, the current operating frequency information, the currently supported moving speed, and the scheduled bandwidth information. The subcarrier spacing configuration parameter information herein may include information such as an OFDM symbol number of the scheduled time-frequency resource, and/or a subframe number, and/or a subcarrier number, and/or a subband number.

304. The user equipment determines, based on the at least one of the subcarrier spacing configuration parameter information, the current operating frequency information, the currently supported moving speed, and the scheduled bandwidth information, a time-frequency resource location for mapping a reference signal.

In this embodiment of the present invention, the user equipment determines, based on the at least one of the subcarrier spacing configuration parameter information, the current operating frequency information, the currently supported moving speed, and the scheduled bandwidth information, the time-frequency resource location for mapping the reference signal. After determining the time-frequency resource location for mapping the reference signal, the user equipment maps the reference signal at the time-frequency resource location, and maps data on another resource within a range of the scheduled time-frequency resource.

This may specifically include the following:

(1) The user equipment determines, based on the at least one of the subcarrier spacing configuration parameter information, the current operating frequency information, the currently supported moving speed, and the scheduled bandwidth information, an interval of reference signals; and the user equipment determines, based on the interval of the reference signals, the time-frequency resource location for mapping the reference signal.

(2) The time-frequency resource location for mapping the reference signal is represented by (k, l), where k is a subcarrier number of the reference signal, and l is an orthogonal frequency-division multiplexing (OFDM) symbol number of the reference signal; and ① the user equipment determines, based on the at least one of the subcarrier spacing configuration parameter information, the current operating frequency information, the currently supported moving speed, and the scheduled bandwidth information, the subcarrier number k of the to-be-mapped reference signal, where the OFDM symbol number l is a first preset value; or ② the user equipment determines, based on the at least one of the subcarrier spacing configuration parameter information, the current operating frequency information, the currently supported moving speed, and the scheduled bandwidth information, the OFDM symbol number l of the to-be-mapped reference signal, where the subcarrier number k is a second preset value; or ③ the user equipment determines, based on the at least one of the subcarrier spacing configuration parameter information, the current operating frequency information, the currently supported moving speed, and the scheduled bandwidth information, the subcarrier number k and the OFDM symbol number l of the to-be-mapped reference signal.

In this embodiment of the present invention, the interval of the reference signals may be an interval in a time dimension or may be an interval in a frequency dimension. The following separately describes the interval in a time dimension and the interval in a frequency dimension.

A: The interval in a time dimension may be in units of subframe, timeslot, or even OFDM symbol. A timeslot and a subframe include several OFDM symbols. For example, in LTE, one subframe includes 14 OFDM symbols, and one timeslot includes seven OFDM symbols, that is, one subframe includes two timeslots.

For example, a subcarrier spacing is $15 \times 2^n$ kHz. If an OFDM symbol is used as an example, a value of the interval may be $3 \times 2^n$ OFDM symbols in this case. If a subframe is used as an example, a value of the interval may be $2^{n-2}$ subframes in this case. It should be noted that when a quantity of subframes included in the interval is a decimal fraction, it indicates that one subframe includes a plurality of resources for reference signal receiving and sending.

In addition, it should also be understood that the value of the interval of the reference signals may alternatively be determined by querying a table based on a subcarrier spacing, an operating frequency, a supported moving speed, scheduled bandwidth information, and/or the like. A table is provided herein by using an OFDM symbol as an example, as listed in Table 1. When operating frequencies are the same, different moving speeds are determined depending on actual operating scenarios. For example, 3 km/h is corresponding to downlink access, and 1 km/h is corresponding to a backhaul link scenario.

TABLE 1

| Quantity of OFDM symbols included in an interval | Subcarrier spacing ($15 \times 2^n$ kHz) | Operating frequency (GHz) | Moving speed (km/h) |
|---|---|---|---|
| 3 | n = 0 | 2 | 60 |
| 6 | n = 0 | 2 | 3 |
| 3 | n = 3 | 30 | 3 |
| 18 | n = 4 | 30 | 1 |
| 6 | n = 5 | 70 | 3 |
| 36 | n = 6 | 70 | 1 |

B: The interval in a frequency dimension may be in units of subcarrier or subband. A subband includes several consecutive subcarriers.

Further, the following describes how the time-frequency resource location corresponding to the reference signal is obtained based on the obtained interval in a time dimension or the obtained interval in a frequency dimension in this embodiment of the present invention.

(1) The interval of the reference signals includes the interval in a time dimension:

① The interval in a time dimension is in units of OFDM symbol, and the subcarrier spacing configuration parameter information includes an OFDM symbol number of the scheduled time-frequency resource; and in time domain, when the interval is in units of OFDM symbol, a modulo method may be used to determine an OFDM symbol number:

$$\mod(n,N)=a \quad (1),\text{ where}$$

n is the OFDM symbol number of the scheduled time-frequency resource, N represents the foregoing determined interval in a time dimension, and a is a preset value, where a value range is $0 \leq a < N$; in this case, all values of n satisfying the formula (1) are to-be-determined OFDM symbol numbers l of to-be-mapped reference signals.

② When the interval in a time dimension is in units of subframe, the subcarrier spacing configuration parameter information includes a subframe number of the scheduled time-frequency resource; and the formula (1) is still used, but n represents the subframe number of the scheduled time-frequency resource; and after all values of n satisfying the formula (1) are determined, l is further determined:

$$l=\{(n-1)\times L+l_1,(n-1)\times L+l_2,(n-1)\times L+l_A\} \quad (2),\text{ where}$$

L represents a quantity of OFDM symbols included in each subframe; A represents a quantity of reference signals included, in a time dimension, in each subframe where a reference signal is included; and it should be understood that l is a set herein, where $l_1, l_2, \ldots,$ and $l_A$ are a series of preset values.

(2) The interval of the reference signals includes the interval in a frequency dimension:

① The interval in a frequency dimension is in units of subcarrier, and the subcarrier spacing configuration parameter information includes a subcarrier number of the scheduled time-frequency resource; and in frequency domain, when the interval in a frequency dimension is in units of subcarrier, the modulo method shown in the formula (1) may be used to determine a subcarrier number:

$$\mod(m,M)=b \quad (3),\text{ where}$$

m is the subcarrier number of the scheduled time-frequency resource, M represents the foregoing determined interval in a frequency dimension, and b is a preset value, where a value range is $0 \leq b < M$; in this case, all values of m satisfying the formula (3) are to-be-determined subcarrier numbers k of to-be-mapped reference signals.

② When the interval in a frequency dimension is in units of subband, the subcarrier spacing configuration parameter information includes a subband number of the scheduled time-frequency resource; and the formula (3) may still be used, but m represents the subband number of the scheduled time-frequency resource; and after all values of m satisfying the formula (3) are determined, k is further determined:

$$k=\{(m-1)\times K+k_1,(m-1)\times K+k_2,\ldots,(m-1)\times K+k_B\} \quad (4),\text{ where}$$

K represents a quantity of subcarriers included in each subband; B represents a quantity of reference signals included, in a frequency dimension, in each subband where a reference signal is included; and it should be understood that k is a set herein, where $k_1, k_2, \ldots$ and $k_B$ are a series of preset values.

(3) The user equipment determines, according to a preset rule and based on the at least one of the subcarrier spacing configuration parameter information, the current operating frequency information, the currently supported moving speed, and the scheduled bandwidth information, the time-frequency resource location for mapping the reference signal.

For example, in the prior art, a subcarrier spacing in an LTE system is 15 kHz, each subframe includes 14 OFDM symbols, and duration of one subframe is 1 ms. Reference signals are placed at an equal interval of four OFDM symbols in one subframe. In this case, in communications systems such as 5G and 6G; if a subcarrier spacing is 120 kHz, 120 kHz is eight times as large as 15 kHz. If a fixed mapping method is used, an interval of reference signals is eight times as large as an interval in the LTE system in frequency domain, and consequently distribution of the reference signals is excessively sparse in frequency domain. An interval of the reference signals is only ⅛ of that in the LTE system in terms of time, resulting in an excessively small interval of the reference signals in terms of time. A reference signal is inserted at an interval of three subcarriers in terms of frequency, and a reference signal is inserted at an interval of two OFDM symbols in terms of time. For details, refer to Table 1.

In this embodiment of the present invention, the time-frequency resource location for mapping the reference signal may be determined by using the preset rule (by using static configuration). When the subcarrier spacing is 120 kHz, a reference signal is inserted at an interval of 3×8=24 subcarriers in terms of frequency, and a reference signal is inserted at an interval of 2/8=0.25 OFDM symbol in terms of time. This is the determined time-frequency resource location for mapping the reference signal.

305. The base station obtains the at least one of the subcarrier spacing configuration parameter information, the current operating frequency information, the currently supported moving speed, and the scheduled bandwidth information.

In this embodiment of the present invention, the base station obtains the at least one of the subcarrier spacing configuration parameter information, the current operating frequency information, the currently supported moving speed, and the scheduled bandwidth information. The subcarrier spacing configuration parameter information herein may include information such as the OFDM symbol number of the scheduled time-frequency resource, and/or the subframe number, and/or the subcarrier number, and/or the subband number.

306. The base station determines, based on the at least one of the subcarrier spacing configuration parameter information, the current operating frequency information, the currently supported moving speed, and the scheduled bandwidth information, the time-frequency resource location for receiving the reference signal.

In this embodiment of the present invention, the base station determines, based on the at least one of the subcarrier spacing configuration parameter information, the current operating frequency information, the currently supported moving speed, and the scheduled bandwidth information, the time-frequency resource location for receiving the reference signal; and receives the reference signal at the location. This may specifically include the following:

(1) The base station determines, based on the at least one of the subcarrier spacing configuration parameter information, the current operating frequency information, the currently supported moving speed, and the scheduled bandwidth information, the interval of the reference signals; and the base station determines, based on the interval of the reference signals, the time-frequency resource location for receiving the reference signal.

(2) The time-frequency resource location for receiving the reference signal is represented by (k, l), where k is a subcarrier number of the reference signal, and l is an orthogonal frequency-division multiplexing (OFDM) symbol number of the reference signal; and ① the base station determines, based on the at least one of the subcarrier spacing configuration parameter information, the current operating frequency information, the currently supported moving speed, and the scheduled bandwidth information, the subcarrier number k of the to-be-received reference signal, where the OFDM symbol number l is a first preset value (that is, l is a fixed value); or ② the base station determines, based on the at least one of the subcarrier spacing configuration parameter information, the current operating frequency information, the currently supported moving speed, and the scheduled bandwidth information, the OFDM symbol number l of the to-be-received reference signal, where the subcarrier number k is a second preset value (that is, k is a fixed value); or ③ the base station determines, based on the at least one of the subcarrier spacing configuration parameter information, the current operating frequency information, the currently supported moving speed, and the scheduled bandwidth information, the subcarrier number k and the OFDM symbol number l of the to-be-received reference signal.

(3) The base station determines, according to the preset rule and based on the at least one of the subcarrier spacing configuration parameter information, the current operating frequency information, the currently supported moving speed, and the scheduled bandwidth information, the time-frequency resource location for receiving the reference signal.

It should be noted that determining the time-frequency resource location for receiving the reference signal is similar to determining the time-frequency resource location for mapping the reference signal. For a detailed process, refer to step 304. Details are not described herein again. A time sequence of determining, by the user equipment, the time-frequency resource location for mapping the reference signal and determining, by the base station, the time-frequency resource location for receiving the reference signal is not specifically limited.

307. The user equipment sends the reference signal to the base station.

In this embodiment of the present invention, this step may include step c and step d as follows:

c. The user equipment maps the reference signal at the time-frequency resource location.

In this embodiment of the present invention, the user equipment maps the reference signal at the time-frequency resource location, and maps data on another resource within the range of the scheduled time-frequency resource. Further, after mapping is complete, the user equipment sends the reference signal and the data to the base station.

d. The base station receives, at the time-frequency resource location, the reference signal sent by the user equipment.

In this embodiment of the present invention, the base station receives, at the determined time-frequency resource location for receiving the reference signal, the reference signal sent by the user equipment, and receives the data sent on the another resource within the range of the scheduled time-frequency resource.

308. The base station performs channel estimation based on the received reference signal.

In this embodiment of the present invention, the base station performs channel estimation based on the received reference signal, and receives and demodulates the data on the another resource within the range of the scheduled time-frequency resource based on estimated channel state information.

In this embodiment of the present invention, compared with the prior art, the reference signal resource mapping method provided in the present invention allows density of the reference signals to still match a coherence bandwidth and a coherence time of a channel at a corresponding operating frequency when different system operating frequencies cause different duration of OFDM symbols. An improvement on the prior art is: In the prior art, fullband access is not considered and it is assumed that there is a unique fixed operating frequency in system design, and one type of subcarrier spacing is selected based on the operating frequency, hardware performance, and a channel scenario. In such a manner, density of reference signals in frequency domain and time domain is fixed. In this embodiment of the present invention, the uplink scheduling process is described. The density of the reference signals in frequency domain and time domain is variable, and the density of the reference signals in frequency domain and time domain may be determined based on the information including the subcarrier spacing configuration parameter, so that the density of the reference signals can still match a coherence bandwidth and a coherence time of a corresponding channel when a system operates at different frequencies and uses different subcarrier spacings, thereby satisfying a receiving and sending requirement for the communications system.

Figure 4:
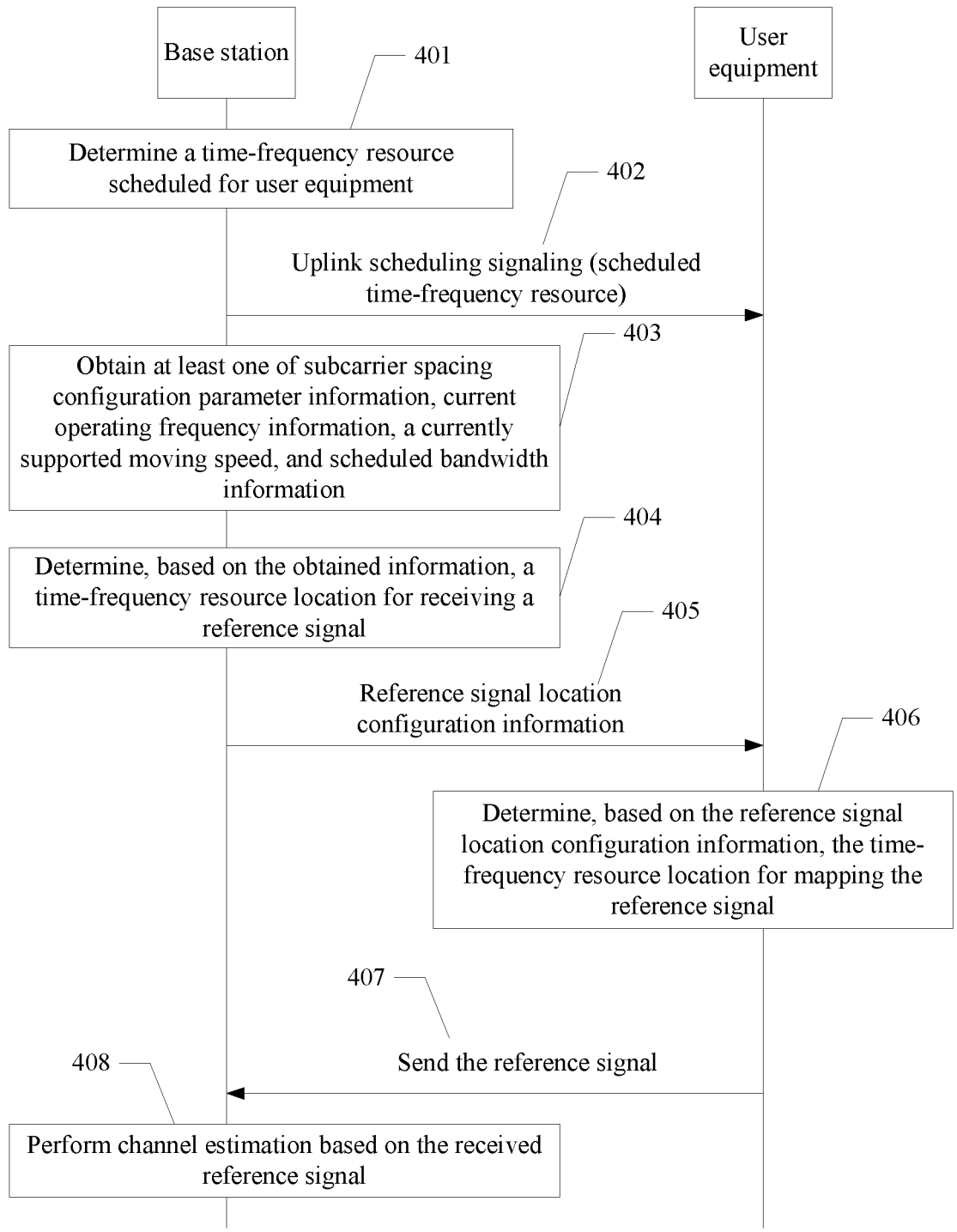
FIG. 4 is a schematic diagram of another embodiment of a resource mapping method according to an embodiment of the present invention.

As shown in FIG. 4, FIG. 4 is a schematic diagram of another embodiment of a resource mapping method according to an embodiment of the present invention. An uplink receiving and sending process in LTE communication, that is, a transmit end is UE and a receive end is a base station, is used as an example for description herein. The method includes the following steps.

401. The base station determines a time-frequency resource scheduled for the user equipment.

402. The base station sends uplink scheduling signaling to the user equipment, where the uplink scheduling signaling includes the scheduled time-frequency resource.

403. The base station obtains at least one of subcarrier spacing configuration parameter information, current operating frequency information, a currently supported moving speed, and scheduled bandwidth information.

404. The base station determines, based on the at least one of the subcarrier spacing configuration parameter information, the current operating frequency information, the currently supported moving speed, and the scheduled bandwidth information, a time-frequency resource location for receiving a reference signal.

In this embodiment of the present invention, steps 401 and 402 are the same as steps 301 and 302, and steps 403 and 404 are the same as steps 305 and 306. Details are not described herein again.

405. The base station sends reference signal location configuration information to the user equipment.

In this embodiment of the present invention, this step may include step e and step f as follows:

e. The base station sends the reference signal location configuration information to the user equipment.

In this embodiment of the present invention, the base station first determines the reference signal location configuration information, and then sends the reference signal location configuration information to the user equipment.

Information related to the reference signal location configuration information may be an interval of reference signals in terms of time and/or an interval of the reference signals in terms of frequency. Further, when the time interval is in units of subframe or timeslot and the frequency interval is in units of subband, the related information may further include an offset in units of OFDM symbol in terms of time and an offset in units of subcarrier in frequency domain.

f. The user equipment receives the reference signal location configuration information.

In this embodiment of the present invention, the user equipment receives the reference signal location configuration information. The information related to the reference signal location configuration information may be the interval of the reference signals in terms of time and/or the interval of the reference signals in terms of frequency. Further, when the time interval is in units of subframe or timeslot and the frequency interval is in units of subband, the related information may further include the offset in units of OFDM symbol in terms of time and the offset in units of subcarrier in frequency domain.

406. The user equipment determines, based on the reference signal location configuration information, the time-frequency resource location for mapping the reference signal.

In this embodiment of the present invention, the user equipment determines, based on the reference signal location configuration information, the time-frequency resource location for mapping the reference signal; and the user equipment maps the reference signal at the time-frequency resource location. For a specific determining method, refer to the formula (1) to the formula (4) in step 304 of the embodiment shown in FIG. 3. Details are not described herein again.

407. The user equipment sends the reference signal to the base station.

In this embodiment of the present invention, this step may include step g and step h as follows:

g. The user equipment sends the reference signal to the base station.

In this embodiment of the present invention, after mapping the reference signal at the determined time-frequency resource location, the user equipment sends the reference signal to the base station at the time-frequency resource location, and sends data on another resource within a range of the scheduled time-frequency resource.

h. The base station receives, at the determined time-frequency resource location for receiving the reference signal, the reference signal sent by the user equipment.

In this embodiment of the present invention, the base station receives, at the determined time-frequency resource location for receiving the reference signal, the reference signal sent by the user equipment, and receives the data sent on the another resource within the range of the scheduled time-frequency resource.

408. The base station performs channel estimation based on the received reference signal.

In this embodiment of the present invention, step 408 is the same as step 308 of the embodiment shown in FIG. 3. Details are not described herein again.

This embodiment of the present invention is an embodiment in which semi-static or dynamic configuration is performed. The base station needs to send reference signal location configuration information to the user equipment; the user equipment determines, based on the reference signal location configuration information, the time-frequency resource location for mapping the reference signal; and the base station determines that the time-frequency resource location for receiving the reference signal does not change.

Figure 5:
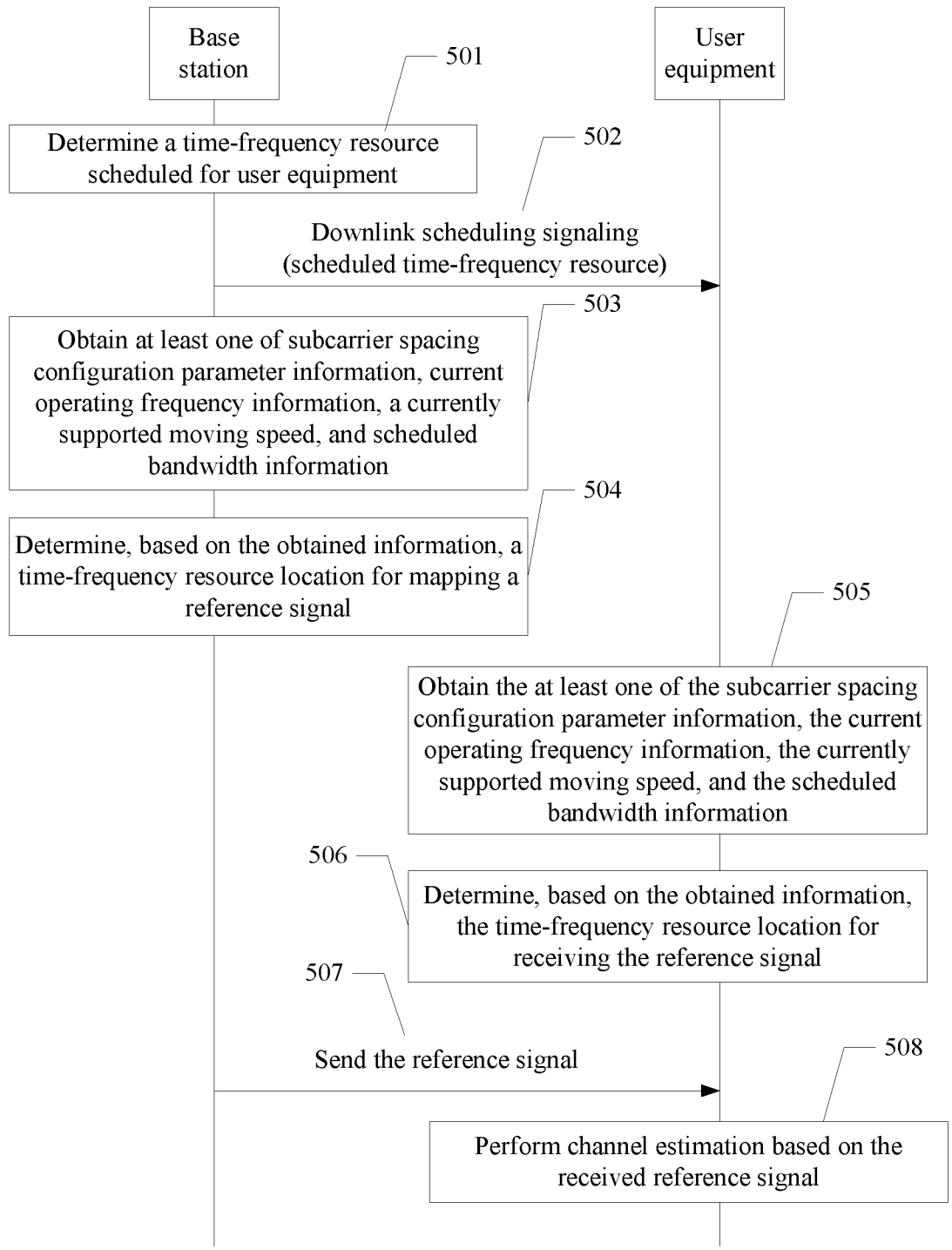
FIG. 5 is a schematic diagram of another embodiment of a resource mapping method according to an embodiment of the present invention.

As shown in FIG. 5, FIG. 5 is a schematic diagram of another embodiment of a resource mapping method according to an embodiment of the present invention. A downlink receiving and sending process in LTE communication, that is, a transmit end is a base station and a receive end is UE, is used as an example for description herein. The method includes the following steps.

501. The base station determines a time-frequency resource scheduled for the user equipment.

502. The base station sends downlink scheduling signaling to the user equipment, where the downlink scheduling signaling includes the scheduled time-frequency resource.

This step may include step a and step b as follows:

a. The base station sends the downlink scheduling signaling to the user equipment, where the downlink scheduling signaling includes the scheduled time-frequency resource.

b. The user equipment receives the downlink scheduling signaling sent by the base station, where the downlink scheduling signaling includes the scheduled time-frequency resource.

In this embodiment of the present invention, the base station first determines the time-frequency resource to be used by a downlink service of the user equipment UE; and then the base station completes scheduling based on a channel state, a service request status, current resource usage, and the like of the UE served by the base station, and determines a corresponding sending algorithm for each UE and a time-frequency resource to be used by each UE. The base station sends the downlink scheduling signaling to the user equipment, where the downlink scheduling signaling includes the scheduled time-frequency resource. The UE receives the downlink scheduling signaling sent by the base station, where the downlink scheduling signaling includes the scheduled time-frequency resource.

503. The base station obtains at least one of subcarrier spacing configuration parameter information, current operating frequency information, a currently supported moving speed, and scheduled bandwidth information.

In this embodiments of the present invention, the base station obtains the at least one of the subcarrier spacing configuration parameter information, the current operating frequency information, the currently supported moving speed, and the scheduled bandwidth information based on the time-frequency resource scheduled for the user equipment. The subcarrier spacing configuration parameter information herein may include information such as an OFDM symbol number of the scheduled time-frequency resource, and/or a subframe number, and/or a subcarrier number, and/or a subband number.

504. The base station determines, based on the at least one of the subcarrier spacing configuration parameter information, the current operating frequency information, the currently supported moving speed, and the scheduled bandwidth information, a time-frequency resource location for mapping a reference signal.

In this embodiment of the present invention, the base station determines, based on the at least one of the subcarrier spacing configuration parameter information, the current operating frequency information, the currently supported moving speed, and the scheduled bandwidth information, the time-frequency resource location for mapping the reference signal. After determining the time-frequency resource location for mapping the reference signal, the base station maps the reference signal at the time-frequency resource location, and maps data on another resource within a range of the scheduled time-frequency resource.

This may specifically include the following:

(1) The base station determines, based on the at least one of the subcarrier spacing configuration parameter information, the current operating frequency information, the currently supported moving speed, and the scheduled bandwidth information, an interval of reference signals; and the base station determines, based on the interval of the reference signals, the time-frequency resource location for mapping the reference signal.

(2) The time-frequency resource location for mapping the reference signal is represented by (k, l), where k is a subcarrier number of the reference signal, and l is an orthogonal frequency-division multiplexing (OFDM) symbol number of the reference signal; and ① the base station determines, based on the at least one of the subcarrier spacing configuration parameter information, the current operating frequency information, the currently supported moving speed, and the scheduled bandwidth information, the subcarrier number k of the to-be-mapped reference signal, where the OFDM symbol number l is a first preset value (that is, l is a fixed value); or ② the base station determines, based on the at least one of the subcarrier spacing configuration parameter information, the current operating frequency information, the currently supported moving speed, and the scheduled bandwidth information, the OFDM symbol number l of the to-be-mapped reference signal, where the subcarrier number k is a second preset value (that is, k is a fixed value); or ③ the base station determines, based on the at least one of the subcarrier spacing configuration parameter information, the current operating frequency information, the currently supported moving speed, and the scheduled bandwidth information, the subcarrier number k and the OFDM symbol number l of the to-be-mapped reference signal.

In this embodiment of the present invention, the interval of the reference signals may be an interval in a time dimension or may be an interval in a frequency dimension. The following separately describes the interval in a time dimension and the interval in a frequency dimension.

A: The interval in a time dimension may be in units of subframe, timeslot, or even OFDM symbol. A timeslot and a subframe include several OFDM symbols. For example, in LTE, one subframe includes 14 OFDM symbols, and one timeslot includes seven OFDM symbols, that is, one subframe includes two timeslots.

For example, a subcarrier spacing is $15 \times 2^n$ kHz. If an OFDM symbol is used as an example, a value of the interval may be $3 \times 2^n$ OFDM symbols in this case. If a subframe is used as an example, a value of the interval may be $2^{n-2}$ subframes in this case. It should be noted that when a quantity of subframes included in the interval is a decimal fraction, it indicates that one subframe includes a plurality of resources for reference signal receiving and sending.

In addition, it should also be understood that the value of the interval of the reference signals may alternatively be determined by querying a table based on a subcarrier spacing, an operating frequency, a supported moving speed, scheduled bandwidth information, and/or the like. A table is provided herein by using an OFDM symbol as an example, as listed in Table 1. When operating frequencies are the same, different moving speeds are determined depending on actual operating scenarios. For example, 3 km/h is corresponding to downlink access, and 1 km/h is corresponding to a backhaul link scenario.

B: The interval in a frequency dimension may be in units of subcarrier or subband. A subband includes several subcarriers.

Further, the following describes how the time-frequency resource location corresponding to the reference signal is obtained based on the obtained interval in a time dimension or the obtained interval in a frequency dimension in this embodiment of the present invention.

(1) The interval of the reference signals includes the interval in a time dimension:

① The interval in a time dimension is in units of OFDM symbol, and the subcarrier spacing configuration parameter information includes an OFDM symbol number of the scheduled time-frequency resource; and in time domain, when the interval is in units of OFDM symbol, a modulo method may be used to determine an OFDM symbol number:

$$\mod(n, N) = a \quad (1), \text{where}$$

n is the OFDM symbol number of the scheduled time-frequency resource, N represents the foregoing determined interval in a time dimension, and a is a preset value, where a value range is 0≤a<N; in this case, all values of n satisfying the formula (1) are to-be-determined OFDM symbol numbers l of to-be-mapped reference signals.

② When the interval in a time dimension is in units of subframe, the subcarrier spacing configuration parameter information includes a subframe number of the scheduled time-frequency resource; and the formula (1) is still used, but n represents the subframe number of the scheduled time-frequency resource; and after all values of n satisfying the formula (1) are determined, l is further determined:

$$l = \{(n-1) \times L + l_1, (n-1) \times L + l_2, (n-1) \times L + l_A\} \quad (2), \text{where}$$

L represents a quantity of OFDM symbols included in each subframe; A represents a quantity of included reference signals, in a time dimension, in each subframe including the reference signals; and it should be understood that l is a set herein, where $l_1, l_2, \ldots,$ and $l_A$ are a series of preset values.

(2) The interval of the reference signals includes the interval in a frequency dimension:

① The interval in a frequency dimension is in units of subcarrier, and the subcarrier spacing configuration parameter information includes a subcarrier number of the scheduled time-frequency resource; and in frequency domain, when the interval in a frequency dimension is in units of subcarrier, the modulo method shown in the formula (1) may be used to determine a subcarrier number:

$$\mod(m, M) = b \quad (3), \text{where}$$

m is the subcarrier number of the scheduled time-frequency resource, M represents the foregoing determined interval in a frequency dimension, and b is a preset value, where a value range is 0≤b<M; in this case, all values of m satisfying the formula (3) are to-be-determined subcarrier numbers k of to-be-mapped reference signals.

② When the interval in a frequency dimension is in units of subband, the subcarrier spacing configuration parameter information includes a subband number of the scheduled time-frequency resource; and the formula (3) may still be used, but m represents the subband number of the scheduled time-frequency resource; and after all values of m satisfying the formula (3) are determined, k is further determined:

$$k = \{(m-1) \times K + k_1, (m-1) \times K + k_2, \ldots, (m-1) \times K + k_B\} \quad (4), \text{where}$$

K represents a quantity of subcarriers included in each subband; B represents a quantity of reference signals included, in a frequency dimension, in each subband where a reference signal is included; and it should be understood that k is a set herein, where $k_1, k_2, \ldots$ and $k_B$ are a series of preset values.

(3) The base station determines, according to a preset rule and based on the at least one of the subcarrier spacing configuration parameter information, the current operating frequency information, the currently supported moving speed, and the scheduled bandwidth information, the time-frequency resource location for mapping the reference signal.

For example, in the prior art, a subcarrier spacing in an LTE system is 15 kHz, each subframe includes 14 OFDM symbols, and duration of one subframe is 1 ms. Reference signals are placed at an equal interval of four OFDM symbols in one subframe. In this case, in communications systems such as 5G and 6G, if a subcarrier spacing is 120 kHz, 120 kHz is eight times as large as 15 kHz. If a fixed mapping method is used, an interval of reference signals is eight times as large as an interval in the LTE system in frequency domain, and consequently distribution of the reference signals is excessively sparse in frequency domain. An interval of the reference signals is only ⅛ of that in the LTE system in terms of time, resulting in an excessively small interval of the reference signals in terms of time. A reference signal is inserted at an interval of three subcarriers in terms of frequency, and a reference signal is inserted at an interval of two OFDM symbols in terms of time. For details, refer to Table 1.

In this embodiment of the present invention, the time-frequency resource location for mapping the reference signal may be determined by using the preset rule (by using static configuration). When the subcarrier spacing is 120 kHz, a reference signal is inserted at an interval of 3×8=24 subcarriers in terms of frequency, and a reference signal is inserted at an interval of 2/8=0.25 OFDM symbol in terms of time. This is the determined time-frequency resource location for mapping the reference signal.

505. The user equipment obtains the at least one of the subcarrier spacing configuration parameter information, the current operating frequency information, the currently supported moving speed, and the scheduled bandwidth information.

In this embodiment of the present invention, the user equipment receives the downlink scheduling signaling sent by the base station, where the downlink scheduling signaling includes the scheduled time-frequency resource; and the user equipment obtained the at least one of the subcarrier spacing configuration parameter information, the current operating frequency information, the currently supported moving speed, and the scheduled bandwidth information. The subcarrier spacing configuration parameter information herein may include information such as the OFDM symbol number of the scheduled time-frequency resource, and/or the subframe number, and/or the subcarrier number, and/or the subband number.

506. The user equipment determines, based on the at least one of the subcarrier spacing configuration parameter information, the current operating frequency information, the currently supported moving speed, and the scheduled bandwidth information, the time-frequency resource location for receiving the reference signal.

In this embodiment of the present invention, the UE determines, based on the at least one of the subcarrier spacing configuration parameter information, the current operating frequency information, the currently supported moving speed, and the scheduled bandwidth information, the time-frequency resource location for receiving the reference signal.

It should be understood that, when static configuration is used herein, the method for determining, by the UE, the time-frequency resource location for receiving the reference signal is the same as the method for determining, by the base station, the time-frequency resource location for sending the reference signal, and is specifically as follows:

(1) The user equipment determines, based on the at least one of the subcarrier spacing configuration parameter information, the current operating frequency information, the currently supported moving speed, and the scheduled bandwidth information, the interval of the reference signals; and the user equipment determines, based on the interval of the reference signals, the time-frequency resource location for receiving the reference signal.

(2) The time-frequency resource location for receiving the reference signal is represented by (k, l), where k is a subcarrier number of the reference signal, and l is an orthogonal frequency-division multiplexing (OFDM) symbol number of the reference signal; and ① the user equipment determines, based on the at least one of the subcarrier spacing configuration parameter information, the current operating frequency information, the currently supported moving speed, and the scheduled bandwidth information, the subcarrier number k of the to-be-received reference signal, where the OFDM symbol number l is a first preset value; or ② the user equipment determines, based on the at least one of the subcarrier spacing configuration parameter information, the current operating frequency information, the currently supported moving speed, and the scheduled bandwidth information, the OFDM symbol number l of the to-be-received reference signal, where the subcarrier number k is a second preset value; or ③ the user equipment determines, based on the at least one of the subcarrier spacing configuration parameter information, the current operating frequency information, the currently supported moving speed, and the scheduled bandwidth information, the subcarrier number k and the OFDM symbol number l of the to-be-received reference signal.

(3) The user equipment determines, according to the preset rule and based on the at least one of the subcarrier spacing configuration parameter information, the current operating frequency information, the currently supported moving speed, and the scheduled bandwidth information, the time-frequency resource location for receiving the reference signal.

It should be noted that determining the time-frequency resource location for receiving the reference signal is similar to determining the time-frequency resource location for mapping the reference signal. For a detailed process, refer to step 504. Details are not described herein again. A time sequence of determining, by the user equipment, the time-frequency resource location for receiving the reference signal and determining, by the base station, the time-frequency resource location for mapping the reference signal is not specifically limited.

507. The base station sends the reference signal to the user equipment.

In this embodiment of the present invention, this step may include step c and step d as follows:

c. The base station sends the reference signal to the user equipment at the time-frequency resource location.

In this embodiment of the present invention, the base station sends the reference signal to each UE at the determined time-frequency resource location within the range of the time-frequency resource scheduled for the UE, and sends data on another resource within the scheduling range. The base station may map the reference signal at the determined time-frequency resource location (k, l), and then send the reference signal; or may map the reference signal based on density of the reference signals that is determined according to the preset rule, and then send the reference signal.

d. The user equipment receives, at the time-frequency resource location, the reference signal sent by the base station.

In this embodiment of the present invention, after determining the time-frequency resource location for receiving the reference signal, the user equipment receives, at the time-frequency resource location, the reference signal sent by the base station, and receives the data sent on the another resource within the range of the scheduled time-frequency resource.

508. The user equipment performs channel estimation based on the received reference signal.

In this embodiment of the present invention, the UE performs channel estimation based on the received reference signal, and receives and demodulates the data on the another resource within the range of the scheduled time-frequency resource based on estimated channel state information.

In this embodiment of the present invention, compared with the prior art, the reference signal resource mapping method provided in the present invention allows the density of the reference signals to still match a coherence bandwidth and a coherence time of a channel at a corresponding operating frequency when different system operating frequencies cause different duration of OFDM symbols. In this embodiment of the present invention, an improvement on the prior art is: In the prior art, fullband access is not considered and it is assumed that there is a unique fixed operating frequency in system design, and one type of subcarrier spacing is selected based on the operating frequency, hardware performance, and a channel scenario. In such a manner, density of reference signals in frequency domain and time domain is fixed. In this embodiment of the present invention, the downlink scheduling process is described. The density of the reference signals in frequency domain and time domain is variable, and the density of the reference signals in frequency domain and time domain may be determined based on the subcarrier spacing configuration parameter information or other information, so that the density of the reference signals can still match a coherence bandwidth and a coherence time of a corresponding channel when a system operates at different frequencies and uses different subcarrier spacings, thereby satisfying a receiving and sending requirement for the communications system.

Figure 6:
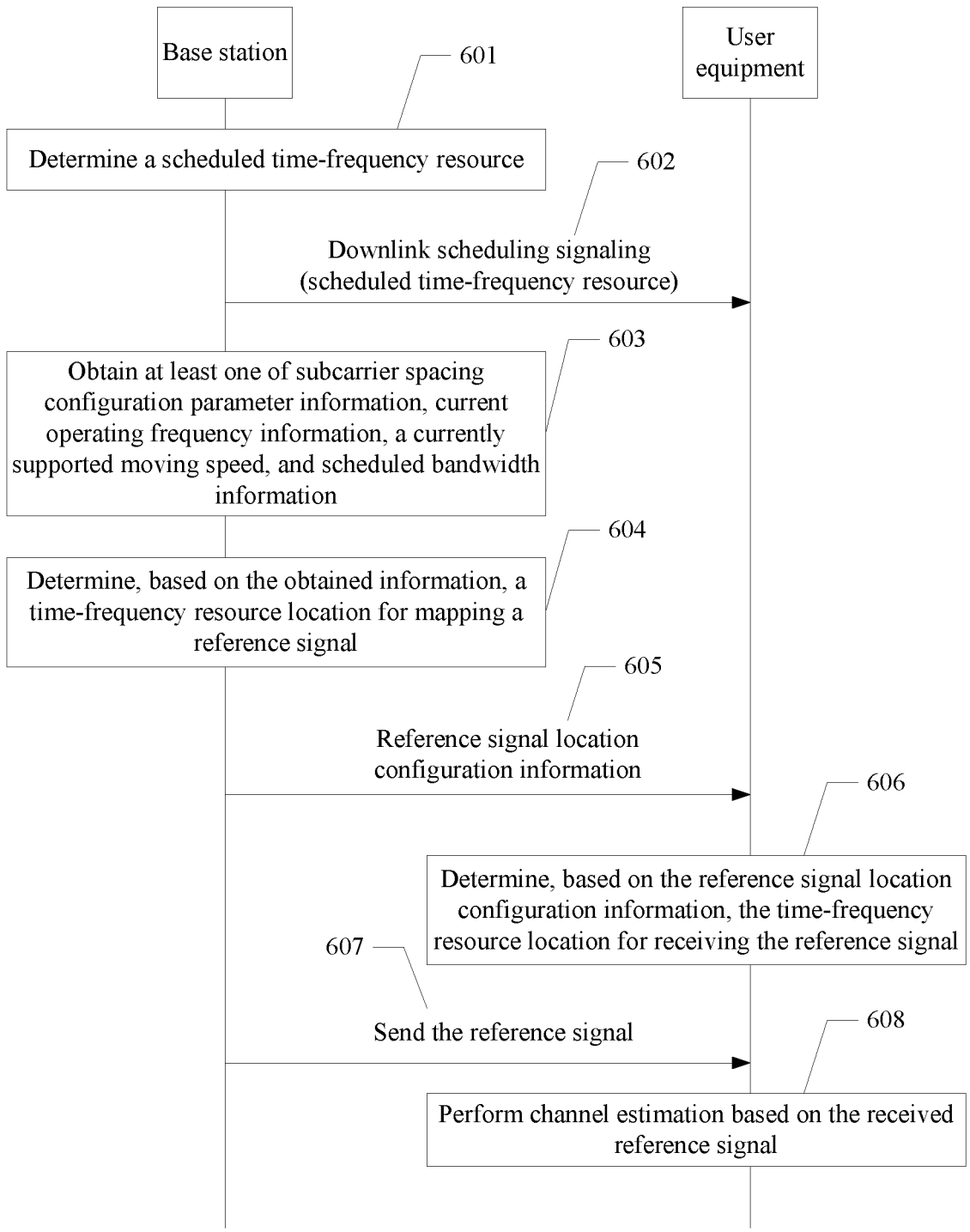
FIG. 6 is a schematic diagram of another embodiment of a resource mapping method according to an embodiment of the present invention.

As shown in FIG. 6, FIG. 6 is a schematic diagram of another embodiment of a resource mapping method according to an embodiment of the present invention. A downlink scheduling process in LTE communication, that is, a transmit end is a base station and a receive end is UE, is used as an example for description herein. The method includes the following steps.

601. The base station determines a time-frequency resource scheduled for the user equipment.

602. The base station sends downlink scheduling signaling to the user equipment, where the downlink scheduling signaling includes the scheduled time-frequency resource.

603. The base station obtains at least one of subcarrier spacing configuration parameter information, current operating frequency information, a currently supported moving speed, and scheduled bandwidth information.

604. The base station determines, based on the at least one of the subcarrier spacing configuration parameter information, the current operating frequency information, the currently supported moving speed, and the scheduled bandwidth information, a time-frequency resource location for mapping a reference signal.

In this embodiment of the present invention, steps 601 to 604 are the same as steps 501 to 504 of the embodiment shown in FIG. 5. Details are not described herein again.

605. The base station sends reference signal location configuration information to the user equipment.

In this embodiment of the present invention, this step may include step e and step f as follows:

e. The base station sends the reference signal location configuration information to the user equipment.

In this embodiment of the present invention, the base station first determines the reference signal location configuration information, and then sends the reference signal location configuration information to the user equipment. Information related to the reference signal location configuration information may be an interval of reference signals in terms of time and/or an interval of the reference signals in terms of frequency. Further, when the time interval is in units of subframe or timeslot and the frequency interval is in units of subband, the related information may further include an offset in units of OFDM symbol in terms of time and an offset in units of subcarrier in frequency domain.

f. The user equipment receives the reference signal location configuration information.

In this embodiment of the present invention, the user equipment receives the reference signal location configuration information. The information related to the reference signal location configuration information may be the interval of the reference signals in terms of time and/or the interval of the reference signals in terms of frequency. Further, when the time interval is in units of subframe or timeslot and the frequency interval is in units of subband, the related information may further include the offset in units of OFDM symbol in terms of time and the offset in units of subcarrier in frequency domain.

606. The user equipment determines, based on the reference signal location configuration information, the time-frequency resource location for receiving the reference signal.

In this embodiment of the present invention, the user equipment determines, based on the reference signal location configuration information, the time-frequency resource location for receiving the reference signal. For a specific determining method, refer to the formula (1) to the formula (4) in step 504 of the embodiment shown in FIG. 5. Details are not described herein again.

607. The base station sends the reference signal to the user equipment.

In this embodiment of the present invention, this step may include step g and step h as follows:

g. The base station sends the reference signal to the user equipment at the time-frequency resource location.

In this embodiment of the present invention, the base station sends the reference signal to each UE at the determined time-frequency resource location within a range of the time-frequency resource scheduled for the UE, and sends data on another resource within the scheduling range. The base station may map the reference signal at the determined time-frequency resource location (k, l), and then send the reference signal; or may map the reference signal based on density of the reference signals that is determined according to a preset rule, and then send the reference signal.

h. The user equipment receives, at the time-frequency resource location, the reference signal sent by the base station.

In this embodiment of the present invention, the user equipment receives, at the determined time-frequency resource location for receiving the reference signal, the reference signal sent by the base station, and receives the data sent on the another resource within the range of the scheduled time-frequency resource.

608. The user equipment performs channel estimation based on the received reference signal.

In this embodiment of the present invention, step 608 is the same as step 508 of the embodiment shown in FIG. 5. Details are not described herein again.

This embodiment of the present invention is an embodiment in which semi-static or dynamic configuration is performed. The base station needs to send the reference signal configuration information to the user equipment; the user equipment determines, based on the reference signal configuration information, the time-frequency resource location for receiving the reference signal; and the base station determines that the time-frequency resource location for sending the reference signal does not change.

Figure 7:
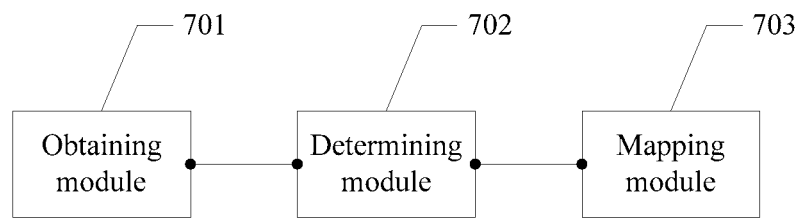
FIG. 7 is a schematic diagram of an embodiment of a transmit end according to an embodiment of the present invention.

The foregoing describes the resource mapping method in the embodiments of the present invention, and the following describes a transmit end and a receive end in the embodiments of the present invention. As shown in FIG. 7, FIG. 7 is a schematic diagram of an embodiment of a transmit end according to an embodiment of the present invention. The transmit end may include:

an obtaining module 701, configured to obtain at least one of subcarrier spacing configuration parameter information, current operating frequency information, a currently supported moving speed, and scheduled bandwidth information;

a determining module 702, configured to determine, based on the at least one of the subcarrier spacing configuration parameter information, the current operating frequency information, the currently supported moving speed, and the scheduled bandwidth information, a time-frequency resource location for mapping a reference signal; and a mapping module 703, configured to map the reference signal at the time-frequency resource location.

Optionally, in some embodiments of the present invention, the determining module 702 is specifically configured to: determine, based on the at least one of the subcarrier spacing configuration parameter information, the current operating frequency information, the currently supported moving speed, and the scheduled bandwidth information, an interval of reference signals; and determine, based on the interval of the reference signals, the time-frequency resource location for mapping the reference signal.

Optionally, in some embodiments of the present invention, the determining module 702 is specifically configured to determine, according to a preset rule and based on the at least one of the subcarrier spacing configuration parameter information, the current operating frequency information, the currently supported moving speed, and the scheduled bandwidth information, the time-frequency resource location for mapping the reference signal.

Optionally, in some embodiments of the present invention, the time-frequency resource location for mapping the reference signal is represented by (k, l), where k is a subcarrier number of the reference signal, and l is an orthogonal frequency-division multiplexing (OFDM) symbol number of the reference signal; and the determining module 702 is specifically configured to determine, based on the at least one of the subcarrier spacing configuration parameter information, the current operating frequency information, the currently supported moving speed, and the scheduled bandwidth information, the subcarrier number k of the to-be-mapped reference signal, where the OFDM symbol number l is a first preset value; or the determining module 702 is specifically configured to determine, based on the at least one of the subcarrier spacing configuration parameter information, the current operating frequency information, the currently supported moving speed, and the scheduled bandwidth information, the OFDM symbol number l of the to-be-mapped reference signal, where the subcarrier number k is a second preset value; or the determining module 702 is specifically configured to determine, based on the at least one of the subcarrier spacing configuration parameter information, the current operating frequency information, the currently supported moving speed, and the scheduled bandwidth information, the subcarrier number k and the OFDM symbol number l of the to-be-mapped reference signal.

Optionally, in some embodiments of the present invention, the transmit end further includes:

a transmitting module, configured to: if the transmit end includes a base station, send reference signal location configuration information to a receive end; or the obtaining module 701 is configured to: if the transmit end includes user equipment, receive reference signal location configuration information and determine, based on the reference signal location configuration information, the time-frequency resource location for mapping the reference signal.

Figure 8:
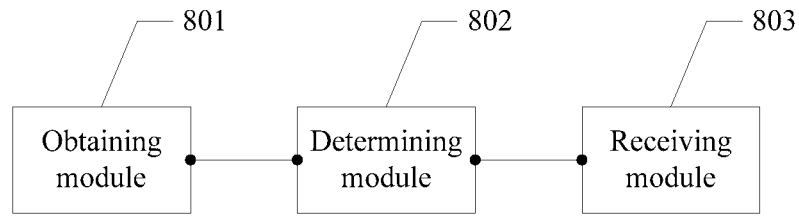
FIG. 8 is a schematic diagram of an embodiment of a receive end according to an embodiment of the present invention.

As shown in FIG. 8, FIG. 8 is a schematic diagram of an embodiment of a receive end according to an embodiment of the present invention. The receive end may include:

an obtaining module 801, configured to obtain at least one of subcarrier spacing configuration parameter information, current operating frequency information, a currently supported moving speed, and scheduled bandwidth information;

a determining module 802, configured to determine, based on the at least one of the subcarrier spacing configuration parameter information, the current operating frequency information, the currently supported moving speed, and the scheduled bandwidth information, a time-frequency resource location for receiving a reference signal; and a receiving module 803, configured to receive, at the time-frequency resource location, the reference signal sent by a transmit end.

Optionally, in some embodiments of the present invention, the determining module 802 is specifically configured to: determine, based on the at least one of the subcarrier spacing configuration parameter information, the current operating frequency information, the currently supported moving speed, and the scheduled bandwidth information, an interval of reference signals; and determine, based on the interval of the reference signals, the time-frequency resource location for receiving the reference signal.

Optionally, in some embodiments of the present invention, the determining module 802 is specifically configured to determine, according to a preset rule and based on the at least one of the subcarrier spacing configuration parameter information, the current operating frequency information, the currently supported moving speed, and the scheduled bandwidth information, the time-frequency resource location for receiving the reference signal.

Optionally, in some embodiments of the present invention, the time-frequency resource location for receiving the reference signal is represented by (k, l), where k is a subcarrier number of the reference signal, and l is an OFDM symbol number of the reference signal; and the determining module 802 is specifically configured to determine, based on the at least one of the subcarrier spacing configuration parameter information, the current operating frequency information, the currently supported moving speed, and the scheduled bandwidth information, the subcarrier number k of the to-be-received reference signal, where the OFDM symbol number l is a first preset value; or the determining module 802 is specifically configured to determine, based on the at least one of the subcarrier spacing configuration parameter information, the current operating frequency information, the currently supported moving speed, and the scheduled bandwidth information, the OFDM symbol number l of the to-be-received reference signal, where the subcarrier number k is a second preset value; or the determining module 802 is specifically configured to determine, based on the at least one of the subcarrier spacing configuration parameter information, the current operating frequency information, the currently supported moving speed, and the scheduled bandwidth information, the subcarrier number k and the OFDM symbol number l of the to-be-received reference signal.

Optionally, in some embodiments of the present invention, the receive end further includes:

a transmitting module, configured to: if the receive end includes a base station, send reference signal location configuration information to the transmit end, where the reference signal location configuration information is used by the transmit end to determine the time-frequency resource location for mapping the reference signal; or the obtaining module 801 is configured to: if the receive end includes user equipment, receive reference signal location configuration information sent by the transmit end and determine, based on the reference signal location configuration information, the time-frequency resource location for receiving the reference signal.

Figure 9:
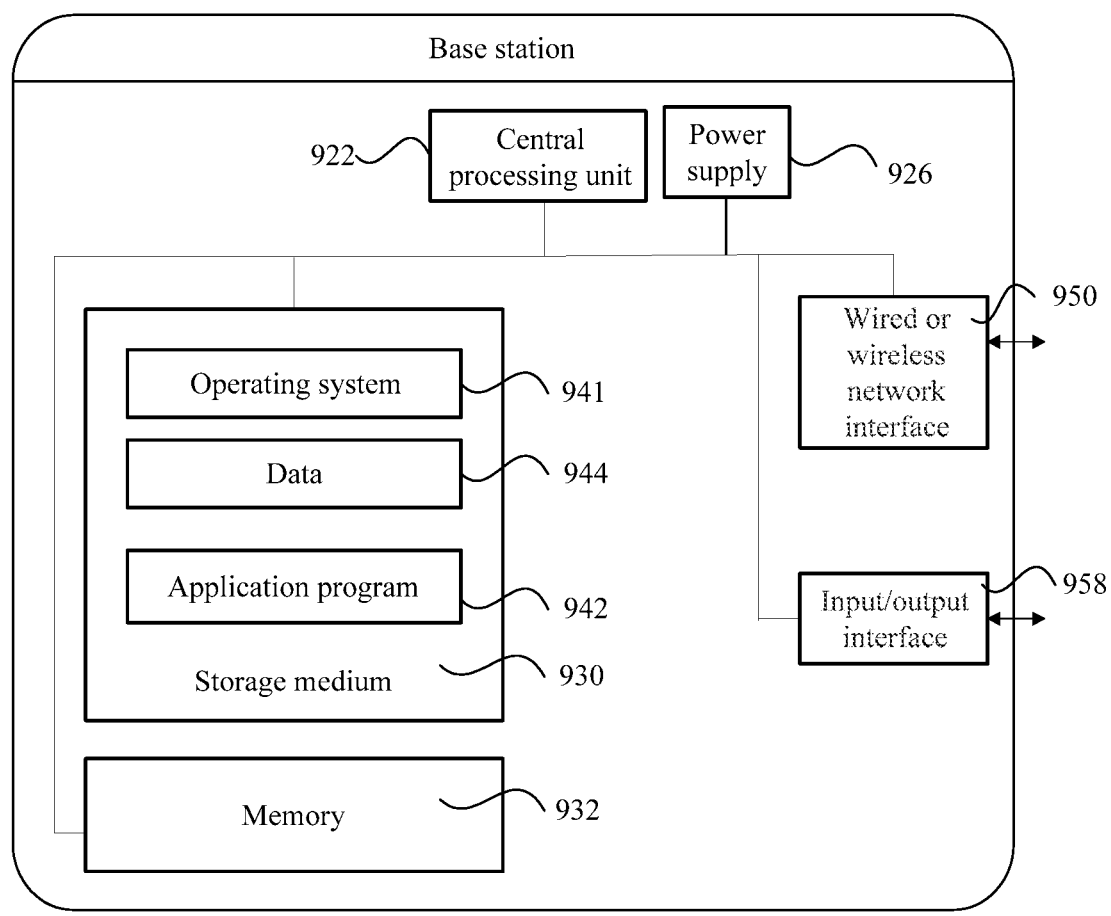
FIG. 9 is a schematic diagram of an embodiment of a base station according to an embodiment of the present invention.

As shown in FIG. 9, FIG. 9 is a schematic diagram of an embodiment of a base station according to an embodiment of the present invention.

The base stations may be greatly different due to a configuration or performance difference, and may include a transceiver 901, at least one central processing unit (central processing unit, CPU) 902 (for example, at least one processor), a memory 903, and at least one storage medium 904 (for example, at least one massive storage device) that stores an application program 9041 or data 9042. The memory 903 and the storage medium 904 may be temporary storage or permanent storage. The program stored in the storage medium 904 may include at least one module (not shown in FIG. 9), where each module may include a series of instruction operations. Further, the central processing unit 902 may be set to communicate with the storage medium 904, and execute, on the base station, the series of instruction operations in the storage medium 904.

In this embodiment of the present invention, the transceiver 901 is configured to perform step 302 in FIG. 3, steps 402 and 405 in FIG. 4, steps 502 and 507 in FIG. 5, and steps 602, 605, and 607 in FIG. 6.

The central processing unit 902 is configured to perform steps 301, 305, 306, and 308 in FIG. 3, steps 401, 403, 404, and 408 in FIG. 4, steps 501, 503, and 504 in FIG. 5, and steps 601, 603, and 604 in FIG. 6.

Figure 10:
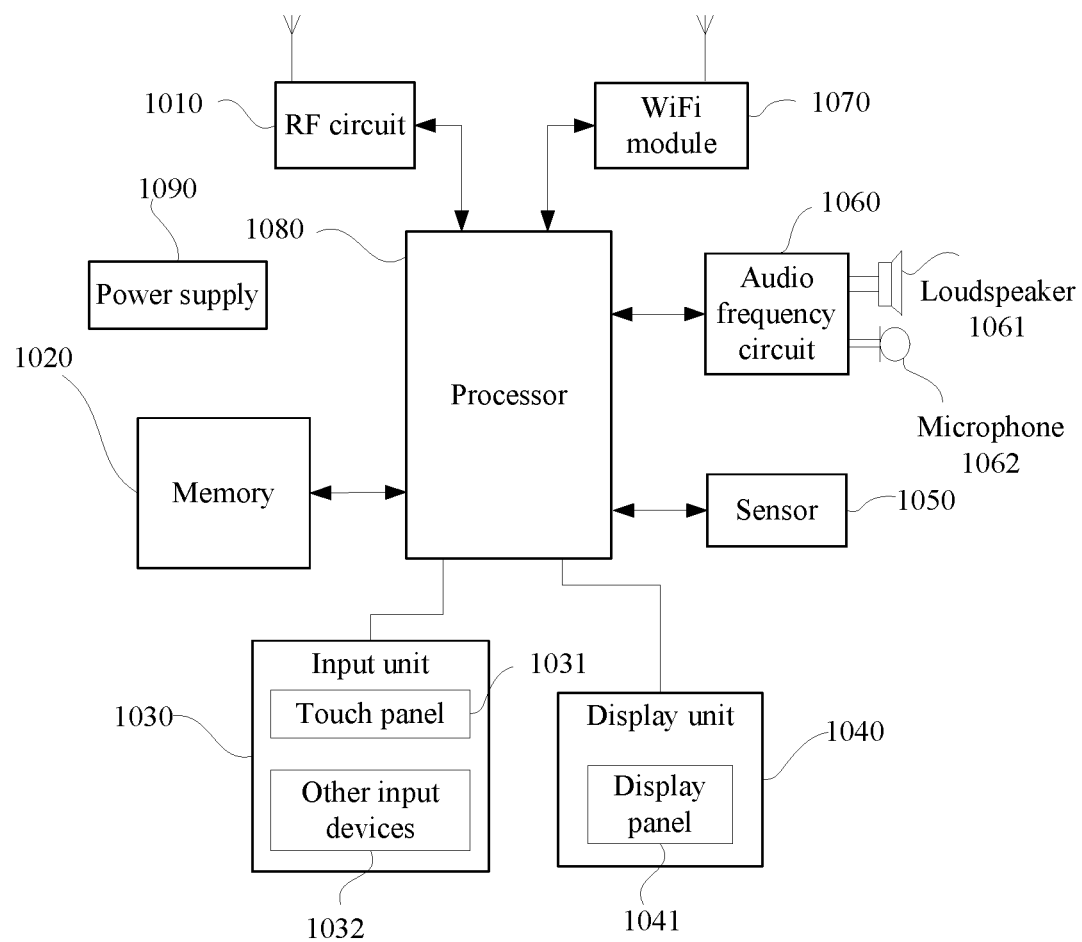
FIG. 10 is a schematic diagram of an embodiment of user equipment according to an embodiment of the present invention.

As shown in FIG. 10, FIG. 10 is a schematic diagram of an embodiment of user equipment according to an embodiment of the present invention.

The user equipment may be any terminal device including a mobile phone, a tablet computer, a personal digital assistant (PDA), a point of sale (POS), an in-vehicle computer, or the like. For example, the user equipment is a mobile phone.

FIG. 10 is a block diagram of a partial structure of a mobile phone related to a terminal according to an embodiment of the present invention. Referring to FIG. 10, the mobile phone includes components such as a radio frequency (RF) circuit 1010, a memory 1020, an input unit 1030, a display unit 1040, a sensor 1050, an audio frequency circuit 1060, a wireless fidelity (WiFi) module 1070, a processor 1080, a power supply 1090, and the like. A person skilled in the art may understand that the mobile phone structure shown in FIG. 10 does not constitute any limitation on the mobile phone, and the mobile phone may include more or fewer components than those shown in the figure, or a combination of some components, or the components disposed differently.

The following describes the constituent parts of the mobile phone in detail with reference to FIG. 10.

The RF circuit 1010 may be configured to receive and send signals in an information receiving and sending process or a call process; in particular, after receiving downlink information of a base station, send the downlink information to the processor 1080 for processing; and, send uplink data to the base station. Usually, the RF circuit 1010 includes but is not limited to an antenna, at least one amplifier, a transceiver, a coupler, a low noise amplifier (LNA), and a duplexer. In addition, the RF circuit 1010 may also communicate with a network and other devices through wireless communication. Any communications standard or protocol may be used for the wireless communication, including but not limited to Global System for Mobile Communications (GSM), General Packet Radio Service (GPRS), Code Division Multiple Access (CDMA), Wideband Code Division Multiple Access (WCDMA), Long Term Evolution (LTE), email, and Short Message Service (SMS).

The memory 1020 may be configured to store a software program and a module. The processor 1080 performs various application functions and data processing of the mobile phone by running the software program and the module that are stored in the memory 1020. The memory 1020 may mainly include a program storage area and a data storage area. The program storage area may store an operating system, an application program required by at least one function (such as a voice playback function and an image playback function), and the like. The data storage area may store data (such as audio data and a phone book) created based on use of the mobile phone, and the like. In addition, the memory 1020 may include a high-speed random access memory, and may further include a non-volatile memory such as at least one magnetic disk storage device, a flash memory device, or another volatile solid-state storage device.

The input unit 1030 may be configured to receive input digital or character information and generate key signal input related to user setting and function control of the mobile phone. Specifically, the input unit 1030 may include a touch panel 1031 and other input devices 1032. The touch panel 1031, also referred to as a touchscreen, may collect a touch operation performed by a user on or near the touch panel 1031 (for example, an operation performed by the user on the touch panel 1031 or near the touch panel 1031 by using any appropriate object or accessory, such as a finger or a stylus), and drive a corresponding connection apparatus according to a preset program. Optionally, the touch panel 1031 may include two parts: a touch detection apparatus and a touch controller. The touch detection apparatus detects a touch location of the user, detects a signal generated by a touch operation, and transmits the signal to the touch controller. The touch controller receives touch information from the touch detection apparatus, converts the touch information into contact coordinates, and sends the contact coordinates to the processor 1080, and is also capable of receiving and executing a command sent by the processor 1080. In addition, the touch panel 1031 may be implemented by using a plurality of types, such as a resistive type, a capacitive type, an infrared type, and a surface acoustic wave type. In addition to the touch panel 1031, the input unit 1030 may include the other input devices 1032. Specifically, the other input devices 1032 may include but is not limited to one or more of a physical keyboard, a function key (such as a volume control key or an on/off key), a trackball, a mouse, and a joystick.

The display unit 1040 may be configured to display information entered by the user, information provided for the user, and various menus of the mobile phone. The display unit 1040 may include a display panel 1041. Optionally, the display panel 1041 may be configured in a form of a liquid crystal display (LCD), an organic light-emitting diode (OLED), or the like. Further, the touch panel 1031 may cover the display panel 1041. After detecting a touch operation on or near the touch panel 1031, the touch panel 1031 transmits information about the touch operation to the processor 1080 to determine a touch event type, and then the processor 1080 provides corresponding visual output on the display panel 1041 based on the touch event type. In FIG. 10, the touch panel 1031 and the display panel 1041 are used as two independent components to implement input and output functions of the mobile phone. However, in some embodiments, the touch panel 1031 and the display panel 1041 may be integrated to implement the input and output functions of the mobile phone.

The mobile phone may further include at least one sensor 1050 such as a light sensor, a motion sensor, or another sensor. Specifically, the light sensor may include an ambient light sensor and a proximity sensor. The ambient light sensor may adjust luminance of the display panel 1041 based on brightness of ambient light. The proximity sensor may turn off the display panel 1041 and/or backlight when the mobile phone moves close to an ear. As a type of motion sensor, an accelerometer sensor may detect values of acceleration in various directions (usually, there are three axes), may detect, in a static state, a value and a direction of gravity, and may be used for an application that identifies a posture (for example, screen switching between a landscape mode and a portrait mode, a related game, and magnetometer posture calibration) of the mobile phone, a vibration-identification-related function (for example, a pedometer and tapping), and the like. Other sensors that can be configured on the mobile phone such as a gyroscope, a barometer, a hygrometer, a thermometer, and an infrared sensor are not described herein.

The audio frequency circuit 1060, a loudspeaker 1061, and a microphone 1062 may provide an audio interface between the user and the mobile phone. The audio frequency circuit 1060 may transmit, to the loudspeaker 1061, an electrical signal that is obtained after conversion of received audio data, and the loudspeaker 1061 converts the electrical signal into a sound signal and outputs the sound signal. In addition, the microphone 1062 converts a collected sound signal into an electrical signal; the audio frequency circuit 1060 receives the electrical signal and converts the electrical signal into audio data, and outputs the audio data to the processor 1080 for processing; and then processed audio data is sent to, for example, another mobile phone by using the RF circuit 1010, or the audio data is output to the memory 1020 for further processing.

WiFi is a short-range wireless transmission technology. By using the WiFi module 1070, the mobile phone may help the user send and receive an email, browse a web page, access streaming media, and the like. The WiFi module 1070 provides wireless broadband Internet access for the user. Although FIG. 10 shows the WiFi module 1070, it can be understood that the WiFi module 1070 is not a mandatory component of the mobile phone, and may be totally omitted depending on requirements without changing the essence scope of the present invention.

The processor 1080 is a control center of the mobile phone, is connected to all the parts of the entire mobile phone by using various interfaces and lines, and executes various functions of the mobile phone and processes data by running or executing the software program and/or the module that are/is stored in the memory 1020 and by invoking data stored in the memory 1020, so as to perform overall monitoring on the mobile phone. Optionally, the processor 1080 may include one or more processing units. Preferably, an application processor and a modem processor may be integrated into the processor 1080. The application processor mainly processes an operating system, a user interface, an application program, and the like, and the modem processor mainly processes wireless communication. It can be understood that the modem processor may alternatively not be integrated into the processor 1080.

The mobile phone further includes the power supply 1090 (for example, a battery) that supplies power to all the components. Preferably, the power supply may be logically connected to the processor 1080 by using a power management system, so that functions such as charging and discharging management and power consumption management are implemented by using the power management system.

Although not shown, the mobile phone may further include a camera, a Bluetooth module, and the like. Details are not described herein.

In this embodiment of the present invention, the processor 1080 included in the user equipment further has the following functions:

performing steps 303 and 304 in FIG. 3, performing step 406 in FIG. 4, performing steps 505, 506, and 508 in FIG. 5, and performing steps 606 and 608 in FIG. 6.

The radio frequency circuit 1010 included in the user equipment further has the following functions:

performing steps 307 in FIG. 3 and performing step 407 in FIG. 4.

An embodiment of the present invention further provides a storage medium. It should be noted that the technical solutions of the present invention essentially, or the part contributing to the prior art, or all or some of the technical solutions may be implemented in a form of a software product. The computer software product is stored in a storage medium. The storage medium is configured to store a computer software instruction for use by the foregoing device. The computer software product includes a program designed for the device in the first aspect or the second aspect. The storage medium includes: any medium that can store program code, such as a USB flash drive, a removable hard disk, a read-only memory (ROM), a random access memory (RAM), a magnetic disk, or an optical disc.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in appropriate cases so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units expressly listed, but may include other steps or units not expressly listed or inherent to such a process, method, product, or device.

What is claimed is:

1. A resource mapping method, comprising:
   obtaining, by a transmit end, a first operating;
   determining, by the transmit end and based on at least the first operating frequency, a first interval of first reference signals;
   determining, by the transmit end based on the first interval of the first reference signals, first time-frequency resource locations for transmitting the first reference signals;
   mapping, by the transmit end, the first reference signals at the first time-frequency resource locations;
   obtaining, by the transmit end, a second operating frequency that is different from the first operating frequency;
   determining, by the transmit end and based on at least the second operating frequency, a second interval of second reference signals, wherein the second interval of the second reference signals is different from the first interval of the first reference signals;
   determining, by the transmit end and based on the second interval of the second reference signals, second time-frequency resource locations for transmitting the second reference signals; and
   mapping, by the transmit end, the second reference signals at the second time-frequency resource locations.

2. The method according to claim 1, further comprising:
   obtaining, by the transmit end, at least one of subcarrier spacing configuration parameter information, a currently supported moving speed, or scheduled bandwidth information, wherein determining the first interval of the first reference signals comprises:
      determining, by the transmit end based on the first operating frequency and the at least one of the subcarrier spacing configuration parameter information, the currently supported moving speed, or the scheduled bandwidth information, the first interval of the first reference signals.

3. The method according to claim 1, further comprising:
   obtaining, by the transmit end, at least one of subcarrier spacing configuration parameter information, a currently supported moving speed, or scheduled bandwidth information, wherein determining the first interval of the first reference signals comprises:
      determining, by the transmit end according to a preset rule and based on the first operating frequency and the at least one of the subcarrier spacing configuration parameter information, the currently supported moving speed, or the scheduled bandwidth information, the first interval of the first reference signals.

4. The method according to claim 1, further comprising:
   obtaining, by the transmit end, at least one of subcarrier spacing configuration parameter information, a currently supported moving speed, or scheduled bandwidth information, wherein a time-frequency resource location for transmitting a reference signal of the first reference signals is represented by (k, l), wherein k is a subcarrier number of the reference signal, and l is an orthogonal frequency-division multiplexing (OFDM) symbol number of the reference signal; and
   determining the first interval of the first reference signals comprises:
      determining, by the transmit end based on the first operating frequency and the at least one of the subcarrier spacing configuration parameter information, the currently supported moving speed, or the scheduled bandwidth information, the subcarrier number k of the reference signal, wherein the OFDM symbol number l is a first preset value; or
      determining, by the transmit end based on the at least one of the subcarrier spacing configuration parameter information, the currently supported moving speed, or the scheduled bandwidth information, the OFDM symbol number l of the reference signal, wherein the subcarrier number k is a second preset value; or
      determining, by the transmit end based on the at least one of the subcarrier spacing configuration parameter information, the currently supported moving speed, or the scheduled bandwidth information, the subcarrier number k and the OFDM symbol number l of the reference signal.

5. The method according to claim 1, wherein the method further comprises:
   if the transmit end comprises a base station, sending, by the transmit end, reference signal location configuration information to a receive end; or
   if the transmit end comprises user equipment, receiving, by the transmit end, reference signal location configuration information and determining, based on the reference signal location configuration information, the first time-frequency resource locations for transmitting the first reference signals.

6. A resource mapping method, comprising:
   obtaining, by a receive end, a first operating frequency;
   determining, by the receive end and based on at least the first operating frequency, a first interval of first reference signals;
   determining, by the receive end based on the first interval of the first reference signals, first time-frequency resource locations for receiving the first reference signals;
   receiving, by the receive end at the first time-frequency resource locations, the first reference signals sent by a transmit end;
   obtaining, by the receive end, a second operating frequency that is different from the first operating frequency;
   determining, by the receive end and based on at least the second operating frequency, a second interval of second reference signals, wherein the second interval of the second reference signals is different from the first interval of the first reference signals;

determining, by the receive end based on the second interval of the second reference signals, second time-frequency resource locations for receiving the second reference signals; and receiving, by the receive end at the second time-frequency resource locations, the second reference signals sent by the transmit end.

7. The method according to claim 6, further comprising:
obtaining, by the transmit end, at least one of subcarrier spacing configuration parameter information, a currently supported moving speed, or scheduled bandwidth information, wherein determining the first interval of the first reference signals comprises:
determining, by the receive end based on the first operating frequency and the at least one of the subcarrier spacing configuration parameter information, the currently supported moving speed, or the scheduled bandwidth information, the first interval of the first reference signals.

8. The method according to claim 6, further comprising:
obtaining, by the receive end, at least one of subcarrier spacing configuration parameter information, a currently supported moving speed, or scheduled bandwidth information, wherein determining the first interval of the first reference signals comprises:
determining, by the receive end according to a preset rule and based on the first operating frequency and the at least one of the subcarrier spacing configuration parameter information, the currently supported moving speed, or the scheduled bandwidth information, the first interval of the first reference signals.

9. The method according to claim 6, further comprising:
obtaining, by the transmit end, at least one of subcarrier spacing configuration parameter information, a currently supported moving speed, or scheduled bandwidth information, wherein a time-frequency resource location for receiving a reference signal of the first reference signals is represented by (k, l), wherein k is a subcarrier number of the reference signal, and l is an OFDM symbol number of the reference signal; and
determining the first interval of the first reference signals comprises:
determining, by the receive end based on the first operating frequency and the at least one of the subcarrier spacing configuration parameter information, the currently supported moving speed, or the scheduled bandwidth information, the subcarrier number k of the reference signal, wherein the OFDM symbol number l is a first preset value; or
determining, by the receive end based on the at least one of the subcarrier spacing configuration parameter information, the currently supported moving speed, or the scheduled bandwidth information, the OFDM symbol number l of the reference signal, wherein the subcarrier number k is a second preset value; or
determining, by the receive end based on the at least one of the subcarrier spacing configuration parameter information, the currently supported moving speed, or the scheduled bandwidth information, the subcarrier number k and the OFDM symbol number l of the reference signal.

10. The method according to claim 6, wherein the method further comprises:
if the receive end comprises a base station, sending, by the receive end, reference signal location configuration information to the transmit end, wherein the reference signal location configuration information is used by the transmit end to determine the first time-frequency resource locations for transmitting the first reference signals; or
if the receive end comprises user equipment, receiving, by the receive end, reference signal location configuration information sent by the transmit end and determining, based on the reference signal location configuration information, the first time-frequency resource locations for receiving the first reference signals.

11. A resource mapping apparatus, comprising:
a non-transitory computer-readable storage medium including executable instructions; and
at least one processor;
wherein the executable instructions, when executed by the at least one processor, cause the apparatus to:
obtain a first operating frequency;
determine, based on at least the first operating frequency, a first interval of first reference signals;
determine, based on the first interval of the first reference signals, first time-frequency resource locations for transmitting the first reference signals;
map the first reference signals at the first time-frequency resource locations;
obtain a second operating frequency that is different from the first operating frequency;
determine, based on at least the second operating frequency, a second interval of second reference signals, wherein the second interval of the second reference signals is different from the first interval of the first reference signals;
determine, based on the second interval of the second reference signals, second time-frequency resource locations for transmitting the second reference signals; and
map the second reference signals at the second time-frequency resource locations.

12. The apparatus according to claim 11, wherein the executable instructions, when executed by the at least one processor, further cause the apparatus to:
obtain at least one of subcarrier spacing configuration parameter information, a currently supported moving speed, or scheduled bandwidth information; and
determine, based on the first operating frequency and the at least one of the subcarrier spacing configuration parameter information, the currently supported moving speed, or the scheduled bandwidth information, the first interval of the first reference signals.

13. The apparatus according to claim 11, wherein the executable instructions, when executed by the at least one processor, further cause the apparatus to:
obtain at least one of subcarrier spacing configuration parameter information, a currently supported moving speed, or scheduled bandwidth information; and
determine, according to a preset rule and based on the first operating frequency and the at least one of the subcarrier spacing configuration parameter information, the currently supported moving speed, or the scheduled bandwidth information, the first interval of the first reference signals.

14. The apparatus according to claim 11, wherein the executable instructions, when executed by the at least one processor, further cause the apparatus to:
obtain at least one of subcarrier spacing configuration parameter information, a currently supported moving speed, or scheduled bandwidth information, wherein a time-frequency resource location for transmitting a reference signal of the first reference signals is represented by (k, l), wherein k is a subcarrier number of the reference signal, and l is an orthogonal frequency-division multiplexing (OFDM) symbol number of the reference signal; and determine, based on the first operating frequency and the at least one of the subcarrier spacing configuration parameter information, the currently supported moving speed, or the scheduled bandwidth information, the subcarrier number k of the reference signal, wherein the OFDM symbol number l is a first preset value; or determine, based on the at least one of the subcarrier spacing configuration parameter information, the currently supported moving speed, or the scheduled bandwidth information, the OFDM symbol number l of the reference signal, wherein the subcarrier number k is a second preset value; or determine, based on the at least one of the subcarrier spacing configuration parameter information, the currently supported moving speed, or the scheduled bandwidth information, the subcarrier number k and the OFDM symbol number l of the reference signal.

15. The apparatus according to claim 11, wherein the executable instructions, when executed by the at least one processor, further cause the apparatus to:
if the apparatus comprises a base station, send reference signal location configuration information to a receive end; or
if the apparatus comprises user equipment, receive reference signal location configuration information and determine, based on the reference signal location configuration information, the first time-frequency resource locations for transmitting the first reference signals.

16. A resource mapping apparatus, comprising:
a non-transitory computer-readable storage medium including executable instructions; and
at least one processor;
wherein the executable instructions, when executed by the at least one processor, cause the apparatus to:
obtain a first operating frequency;
determine, based on at least the first operating frequency, a first interval of first reference signals;
determine, based on the first interval of the first reference signals, first time-frequency resource locations for receiving the first reference signals;
receive, at the first time-frequency resource locations, the first reference signals sent by a transmit end;
obtain a second operating frequency that is different from the first operating frequency;
determine, based on at least the second operating frequency, a second interval of second reference signals, wherein the second interval of the second reference signals is different from the first interval of the first reference signals;
determine, based on the second interval of the second reference signals, second time-frequency resource locations for receiving the second reference signals; and
receive, at the second time-frequency resource locations, the second reference signals sent by the transmit end.

17. The apparatus according to claim 16, wherein the executable instructions, when executed by the at least one processor, further cause the apparatus to:
obtain at least one of subcarrier spacing configuration parameter information, a currently supported moving speed, or scheduled bandwidth information; and
determine, based on the first operating frequency and the at least one of the subcarrier spacing configuration parameter information, the currently supported moving speed, or the scheduled bandwidth information, the first interval of the first reference signal.

18. The apparatus according to claim 16, wherein the executable instructions, when executed by the at least one processor, further cause the apparatus to:
obtain at least one of subcarrier spacing configuration parameter information, a currently supported moving speed, or scheduled bandwidth information; and
determine, according to a preset rule and based on the first operating frequency and the at least one of the subcarrier spacing configuration parameter information, the currently supported moving speed, or the scheduled bandwidth information, the first interval of the first reference signals.

19. The apparatus according to claim 16, wherein the executable instructions, when executed by the at least one processor, further cause the apparatus to:
obtain at least one of subcarrier spacing configuration parameter information, a currently supported moving speed, or scheduled bandwidth information, wherein a time-frequency resource location for receiving a reference signal of the first reference signals is represented by (k, l), wherein k is a subcarrier number of the reference signal, and l is an orthogonal frequency-division multiplexing (OFDM) symbol number of the reference signal; and determine, based on the first operating frequency and the at least one of the subcarrier spacing configuration parameter information, the currently supported moving speed, or the scheduled bandwidth information, the subcarrier number k of the reference signal, wherein the OFDM symbol number l is a first preset value; or determine, based on the at least one of the subcarrier spacing configuration parameter information, the currently supported moving speed, or the scheduled bandwidth information, the OFDM symbol number l of the reference signal, wherein the subcarrier number k is a second preset value; or determine, based on the at least one of the subcarrier spacing configuration parameter information, the currently supported moving speed, or the scheduled bandwidth information, the subcarrier number k and the OFDM symbol number l of the reference signal.

20. The apparatus according to claim 16, wherein the executable instructions, when executed by the at least one processor, further cause the apparatus to:
if the apparatus comprises a base station, send reference signal location configuration information to the transmit end, wherein the reference signal location configuration information is used by the transmit end to determine the first time-frequency resource locations for transmitting the first reference signals; or
if the apparatus comprises user equipment, receive reference signal location configuration information sent by the transmit end and determine, based on the reference signal location configuration information, the first time-frequency resource locations for transmitting the first reference signals.

* * * * *